US010394177B2

(12) United States Patent
Yoshida

(10) Patent No.: US 10,394,177 B2
(45) Date of Patent: Aug. 27, 2019

(54) DRIVE TRANSMISSION APPARATUS AND IMAGE FORMING APPARATUS

(71) Applicant: CANON KABUSHIKI KAISHA, Tokyo (JP)

(72) Inventor: Atsushi Yoshida, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/641,522

(22) Filed: Jul. 5, 2017

(65) Prior Publication Data

US 2018/0017926 A1 Jan. 18, 2018

(30) Foreign Application Priority Data

Jul. 12, 2016 (JP) ................................ 2016-137493

(51) Int. Cl.
*G03G 15/00* (2006.01)
*F16H 1/20* (2006.01)
*G03G 21/16* (2006.01)
*G03G 15/20* (2006.01)

(52) U.S. Cl.
CPC ......... *G03G 15/6529* (2013.01); *F16H 1/206* (2013.01); *G03G 21/1647* (2013.01); *B65H 2402/31* (2013.01); *B65H 2403/422* (2013.01); *B65H 2601/324* (2013.01); *G03G 15/2028* (2013.01); *G03G 2221/1657* (2013.01)

(58) Field of Classification Search
CPC ................................................ G03G 15/6529
USPC ........................................................ 399/400
See application file for complete search history.

(56) References Cited

U.S. PATENT DOCUMENTS 6,098,975 A * 8/2000 Kobayashi ................ B42C 1/12 270/58.09
6,142,461 A * 11/2000 Asao ......................... B42C 1/12 270/58.09
8,150,287 B2 * 4/2012 Souda ................ G03G 15/6573 399/388
9,316,961 B2 * 4/2016 Suzuki ............... G03G 15/2014
9,541,884 B1 * 1/2017 Kawai .................. G03G 15/757
2003/0235432 A1 * 12/2003 Ahn ................... G03G 15/0896 399/222

(Continued)

FOREIGN PATENT DOCUMENTS

CN 201278081 Y 7/2009
CN 102003505 A 4/2011

(Continued)

OTHER PUBLICATIONS

Chinese Office Action issued in corresponding Chinese Application No. 201710554191.X dated Apr. 2, 2019.

*Primary Examiner* — Anthony H Nguyen
(74) *Attorney, Agent, or Firm* — Venable LLP

(57) ABSTRACT

The present disclosure provides a drive transmission apparatus including a swing gear mechanism and capable of reducing the workload during assembly and improving efficiency of the assembly operation. A first swing gear, which transmits rotation of a first input gear that is driven by a driving force, is held by a first swing member. The first swing member includes a first engagement portion engaging with a supporting portion, and swings around an axis of the first input gear. The first engagement portion is formed so as to be attached to and detached from the supporting portion if the first swing member is moved in a radial direction with respect to the axis.

16 Claims, 19 Drawing Sheets

(56) References Cited

U.S. PATENT DOCUMENTS

| | | | | |
|---|---|---|---|---|
| 2011/0052261 | A1 | 3/2011 | Fukushima et al. | |
| 2011/0158695 | A1* | 6/2011 | Tamura | F16D 27/118 399/223 |
| 2014/0016957 | A1 | 1/2014 | Suzuki et al. | |
| 2015/0037071 | A1* | 2/2015 | Yamamoto | G03G 15/0879 399/258 |
| 2017/0075279 | A1 | 3/2017 | Hayakawa | |

FOREIGN PATENT DOCUMENTS

| | | | |
|---|---|---|---|
| CN | 106542356 | A | 3/2017 |
| JP | 2004-060666 | A | 2/2004 |

* cited by examiner

DRIVE TRANSMISSION APPARATUS AND IMAGE FORMING APPARATUS

BACKGROUND OF THE INVENTION

Field of the Invention

The present invention relates to a drive transmission apparatus configured to transmit driving force from a driving source to an operation part, and an image forming apparatus equipped with the drive transmission apparatus.

Description of the Related Art

Heretofore, in the field of image forming apparatuses, a configuration adopting a swing gear mechanism with the aim to transmit driving force from a driving source such as a motor has been known. Japanese Unexamined Patent Application Publication No. 2004-060666 discloses a drive transmission apparatus in which driving force is transmitted from a main body unit equipped with a driving motor via two swing gears to an opening/closing unit that can be opened and closed with respect to the main body unit.

According to this configuration, each swing gear, arranged in the main body unit and meshed with a drive gear driven by a driving motor, is supported by a support arm swingable with respect to the drive gear. The swing gear is arranged to be meshed with a driven gear arranged in an opening/closing unit in the state where the opening/closing unit is closed, such that change in distance between axes of the drive gear and driven gear caused by displacement of the opening/closing unit in a closed state is absorbed.

Now, according to such a configuration including a swing gear mechanism as the above described document, unlike normal gears having a fixed axial position, the support arm supporting the swing gear must be swingable in the assembled state. Therefore, the assembling operation should be carried out in a state where the drive gear, the swing gear and the support arm are positioned such that the swing gear is meshed with the drive gear, and that the support arm is swingable after being assembled.

However, if such assembling operation is performed manually, the operation of mounting the support arm swingably with respect to the drive gear is carried out while holding a plurality of members including the swing gear and the support arm, and this causes complication of the assembling operation. Even if components are temporarily assembled before carrying out the assembling operation with the aim to reduce workload of the assembling operation, the temporal assemble process causes the number of steps for manufacturing the entire apparatus to be increased.

SUMMARY OF THE INVENTION

The present invention provides a drive transmission apparatus capable of reducing the workload during assembly and improving efficiency of the assembly operation, and an image forming apparatus equipped with the same.

According to one aspect of the present invention, a drive transmission apparatus includes a first input gear configured to be driven by driving force from a driving source, a first swing gear configured to be rotated by driving force from the first input gear, a supporting portion arranged on an axis of the first input gear, and a first swing member configured to swing the first swing gear and including a first engagement portion configured to be engaged pivotably with the supporting portion and a first retaining portion configured to retain the first swing gear in a rotatable manner. The first engagement portion is attached to and detached from the supporting portion if the first swing member is moved in a radial direction with respect to an axis of the first input gear.

According to another aspect of the present invention, a drive transmission apparatus includes an apparatus body, a driving source arranged in the apparatus body and configured to output rotation in a first direction and rotation in a second direction opposite to the first direction, a conveyance unit including a conveyance member configured to convey a sheet, a first output gear connected to the conveyance member, a movement mechanism configured to move the conveyance unit relatively with respect to the apparatus body by the movement mechanism, and a second output gear connected to the movement mechanism, and a drive transmission apparatus configured to transmit driving force from the driving source to the conveyance unit. The drive transmission apparatus includes a first input gear configured to be driven by the driving source if the driving source outputs rotation in the first direction, a second input gear arranged coaxially with the first input gear and configured to be driven by the driving source if the driving source outputs rotation in the second direction, a first swing gear meshed with the first input gear and the first output gear, a second swing gear meshed with the second input gear and the second output gear, a supporting portion arranged on an axis of the first and second input gears, a first swing member configured to swing the first swing gear, and a second swing member configured to swing the second swing gear. The first swing member includes a first engagement portion configured to be engaged pivotably with the supporting portion, and a first retaining portion configured to retain the first swing gear in a rotatable manner. The first engagement portion is attached to and detached from the supporting portion if the first swing member is moved in a radial direction with respect to the axis of the first and second input gears. The second swing member includes a second engagement portion configured to be engaged with the supporting portion and a second retaining portion configured to retain the second swing gear in a rotatable manner. The second engagement portion is attached to and detached from the supporting portion if the second swing member is moved in a radial direction with respect to the axis of the first and second input gears.

Further features of the present invention will become apparent from the following description of exemplary embodiments with reference to the attached drawings.

DESCRIPTION OF THE EMBODIMENTS

Figure 1:
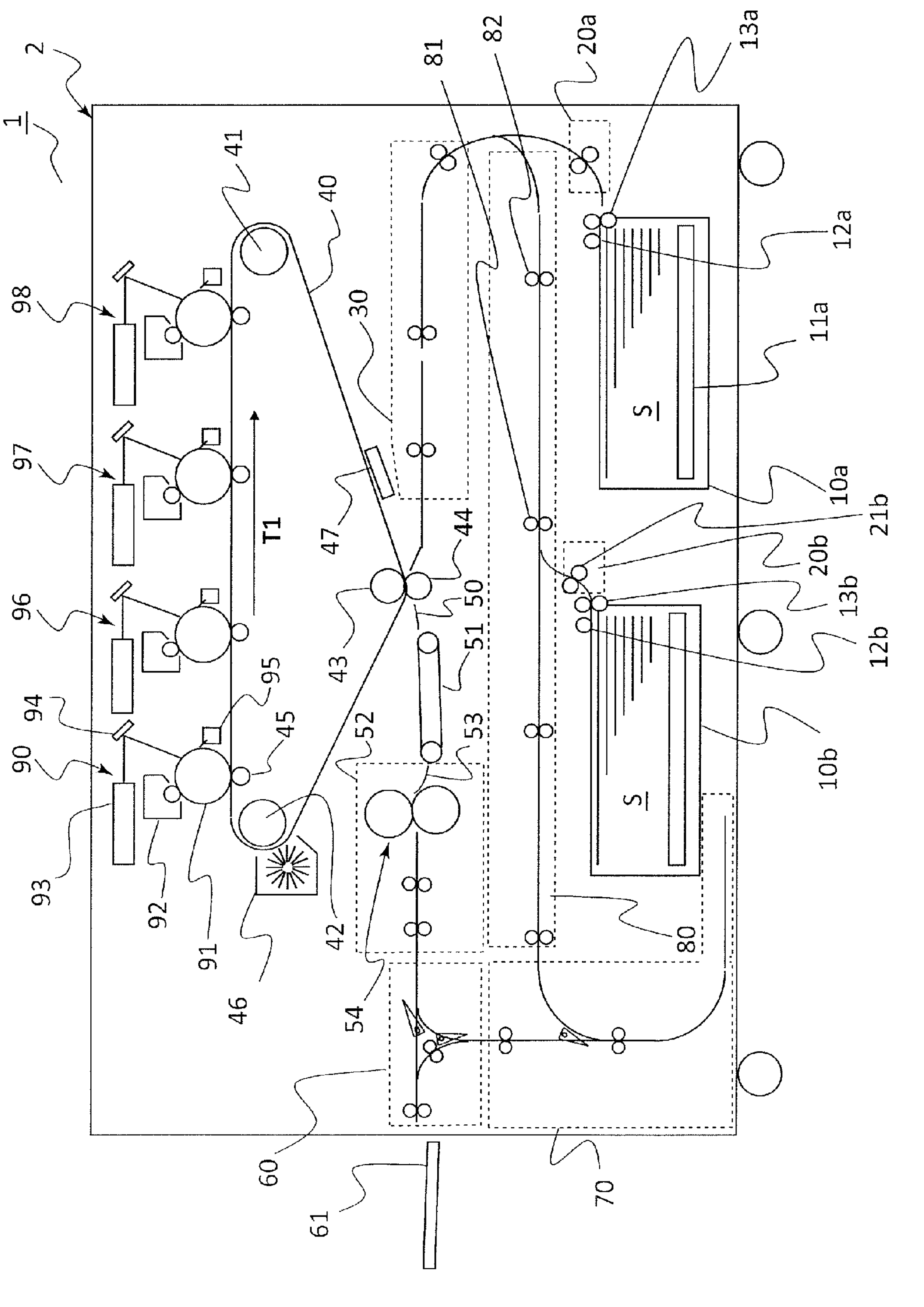
FIG. 1 is a schematic view illustrating a configuration of an image forming apparatus according to a first embodiment.

Now, an image forming apparatus according to the present disclosure will be described with reference to the drawings. An image forming apparatus 1 illustrated in FIG. 1 is a full-color printer in which an image is formed and output on a sheet S based on image information entered from an external PC or an image information read from a document. Sheet S refers to a recording medium in the form of a thin layer, including paper such as a plain paper or an envelope, a plastic film such as an overhead projector (OHP) sheet, and cloth.

A plurality of sheet feeding units 10*a* and 10*b* are provided on an apparatus body 2 of the image forming apparatus 1. The respective sheet feeding units 10*a* and 10*b* are equipped with lift-up units 11*a* and 11*b* that can be lifted and lowered while supporting a sheet S, and feed rollers 12*a* and 12*b* feeding the sheets S supported on the lift-up units 11*a* and 11*b*. The sheets S sent out by the feed rollers 12*a* and 12*b* are separated one sheet at a time by separation rollers 13*a* and 13*b*, and conveyed via drawing roller pairs 20*a* and 20*b* toward a registration unit 30. The sheet S fed from the sheet feeding unit 10*b* arranged on the left side in the drawing is conveyed via a duplex conveyance unit 80 described later.

Simultaneously as the above-described conveyance process of the sheet S, an imaging operation, i.e., image forming process, of toner image is executed in image forming units 90, 96, 97 and 98. The image forming units 90, 96, 97 and 98, which are examples of the image forming units, respectively form toner images of yellow, magenta, cyan and black colors. The configuration of these image forming units are similar, excluding the color of the toner used for developing the image, so in the following description, the yellow image forming unit 90 will be described as an example.

The image forming unit 90 is an electro-photographic image forming unit equipped with a photosensitive drum 91 serving as a photoconductor. An exposing unit 93, a developing apparatus 92, a cleaner 95 and so on are arranged around the photosensitive drum 91. In a state where image forming operation is started, a surface of the photosensitive drum 91 is charged uniformly by a charger not shown along with the rotation of the photosensitive drum 91. The exposing unit 93 modulates and outputs laser beams based on image information, and scans the photosensitive drum 91 using a mirror 94 constituting a scanning optical system, to thereby create an electrostatic latent image on the drum surface. The developing apparatus supplies charged toner to the photosensitive drum 91, and forms, i.e., develops the electrostatic latent image as a toner image.

An intermediate transfer belt 40 serving as an intermediate transfer member is formed of an endless belt-shaped film, and the belt is wound around a drive roller 42, a tension roller 41, and a secondary transfer inner roller 43. The intermediate transfer belt 40 is driven to rotate by the drive roller 42 in a predetermined direction, illustrated by arrow T1. Primary transfer rollers 45 are arranged at a position opposing to the photosensitive drums 91 of the respective image forming units 90, 96, 97 and 98 at an inner circumference side of the intermediate transfer belt 40. By applying bias voltage to the primary transfer rollers 45, the toner images formed in the image forming units 90, 96, 97 and 98 are subjected to primary transfer to the intermediate transfer belt 40 such that the toner images of the respective colors are superposed. Attached substances such as transfer residual toner remaining on the photosensitive drum 91 without being transferred to the intermediate transfer belt 40 are removed by the cleaner 95.

A secondary transfer roller 44 serving as a transfer member configured to transfer a toner image onto a sheet is in pressure contact with the secondary transfer inner roller 43 and interposing the intermediate transfer belt 40, and forms a secondary transfer portion serving as a nip portion with the intermediate transfer belt 40. After correcting skew feed of the sheet S, the above-described registration unit 30 transfers the sheet S to the secondary transfer portion, along with the advancement of the image forming operation of the toner image. In a state where bias voltage is applied to the secondary transfer roller 44, the full-color toner image formed on the intermediate transfer belt 40 is collectively subjected to secondary transfer to the sheet S. The attached substances such as the transfer residual toner remaining on the intermediate transfer belt 40 without being transferred to the sheet S is removed by a cleaner 46.

The sheet S to which the toner image has been transferred at the secondary transfer portion is conveyed by a pre-fixing conveyance unit 51 described in detail later toward a fixing unit 52. The fixing unit 52, which is one example of a fixing unit, includes a fixing roller pair 54 serving as a pair of rotary fixing members configured to nip and convey a sheet, and a heat source such as a halogen heater. The fixing unit applies heat and pressure to the sheet S at the nip portion of the fixing roller pair 54 to fix the toner image onto the sheet. The configuration described later can be applied in a state where the sheet S is conveyed via a rotary member pair in which one side or both sides of the members constituting the nip portion is/are formed of a belt member, in place of the fixing roller pair 54.

In the case of single surface printing, the sheet S having passed through the fixing unit 52 is guided to a branch conveyance unit 60, and discharged onto a sheet discharge tray 61 provided outside the apparatus body 2. On the other hand, in the case of duplex printing, the sheet S having passed through the fixing unit 52 is guided to a reverse conveyance unit 70 by the branch conveyance unit 60. The sheet S is subjected to switch-back at the reverse conveyance unit 70, and conveyed by the duplex conveyance unit 80 toward the registration unit 30. Then, the sheet S formed an image on a second surface through a similar process as the first surface described above is guided by the branch conveyance unit 60 and discharged onto the sheet discharge tray 61.

Pre-Fixing Conveyance Unit

Next, the configuration of the pre-fixing conveyance unit 51 will be described. The pre-fixing conveyance unit 51 is composed of a conveyance portion 51*b* serving as a conveyance unit configured to convey the sheet S, and a base portion 51*a* serving as a driving unit described later.

Figure 2:
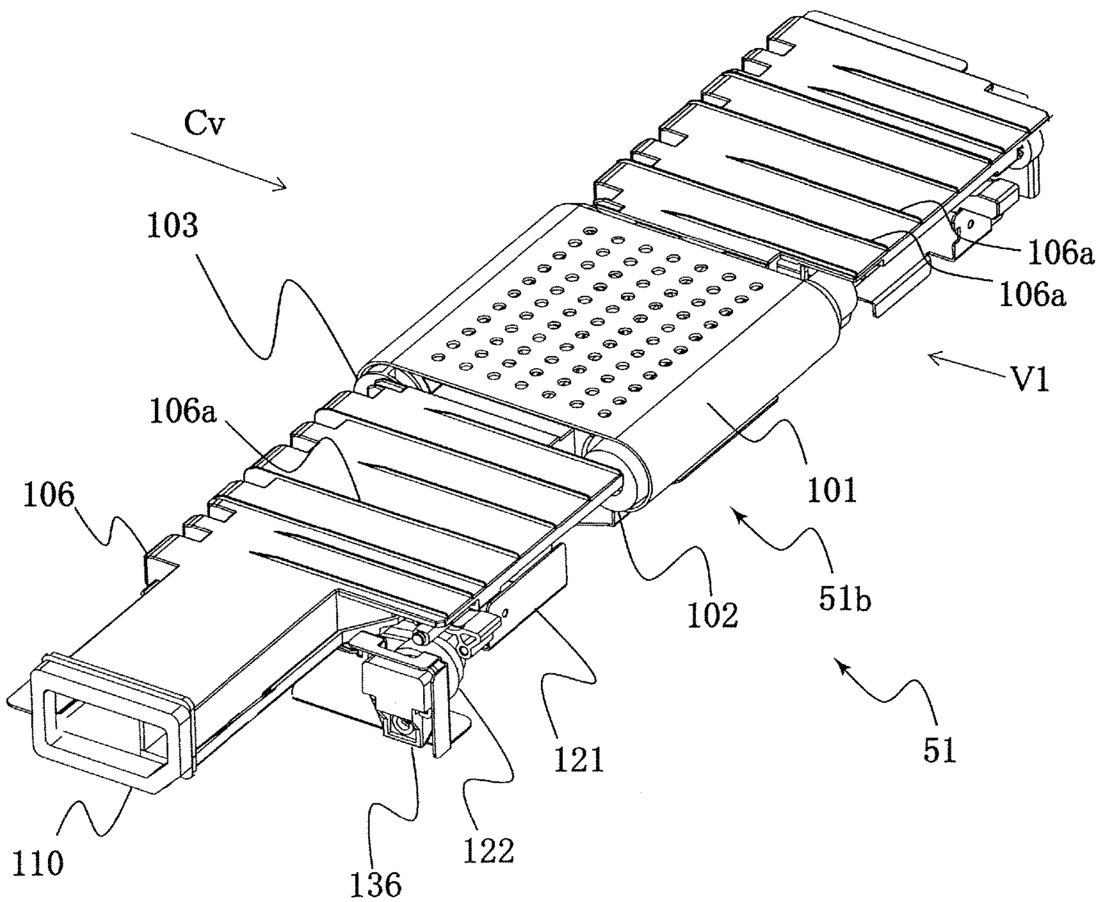
FIG. 2 is a perspective view of a pre-fixing conveyance unit.
Figure 3:
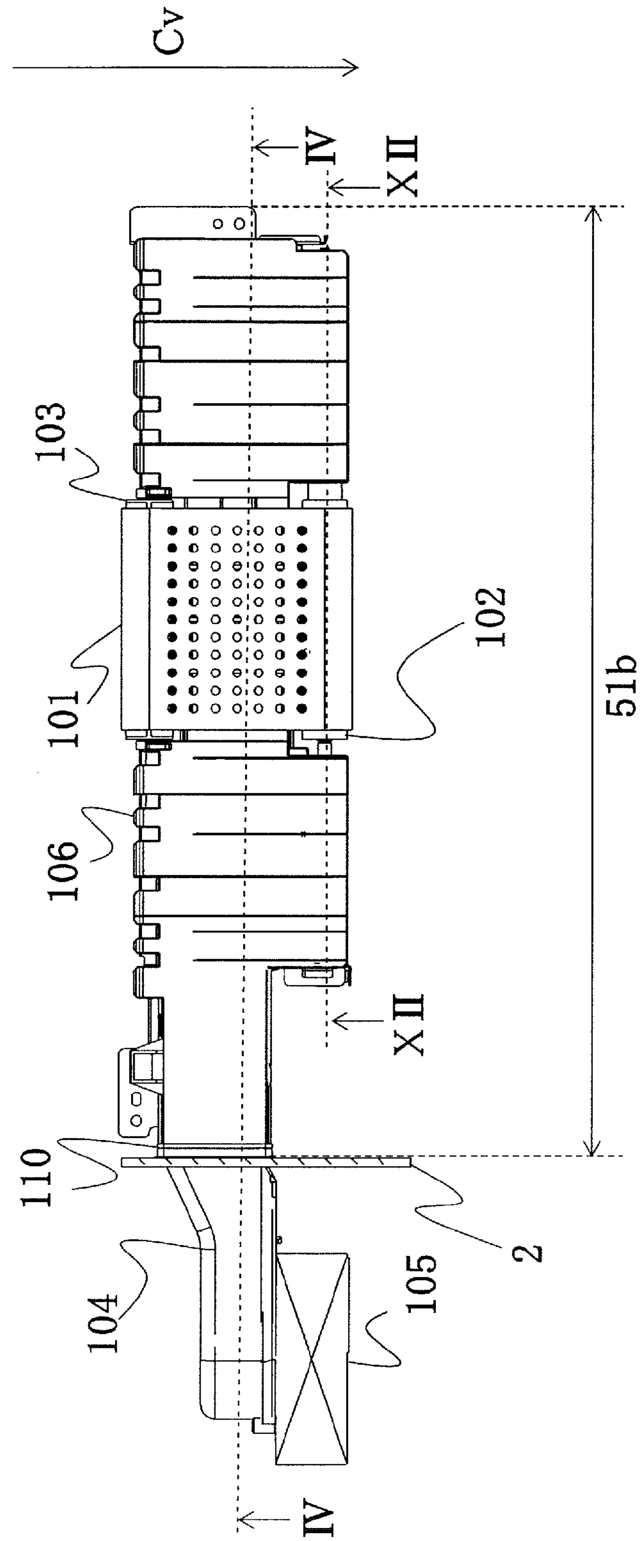
FIG. 3 is an upper view of the pre-fixing conveyance unit.

As illustrated in FIGS. 2 and 3, the conveyance portion 51*b* is a suction belt-type conveyance unit including an endless conveyor belt 101 serving as a conveyance member. The conveyance portion 51*b* includes a drive pulley 102 and a driven pulley 103 serving as support rollers configured to support the conveyor belt 101, and a guide member 106 configured to guide the sheet S. The conveyor belt 101 having a large number of air holes formed regularly thereto is driven to rotate by the drive pulley 102 along a sheet conveyance direction Cv. The guide member 106 is arranged on both sides of the conveyor belt 101 with respect to a width direction orthogonal to the sheet conveyance direction Cv. An upper surface of the guide member 106 has a plurality of ribs 106*a* extending along the sheet conveyance direction Cv, and the guide member 106 constitutes a guide surface configured to guide the sheet S conveyed along the conveyor belt 101.

Figure 4:
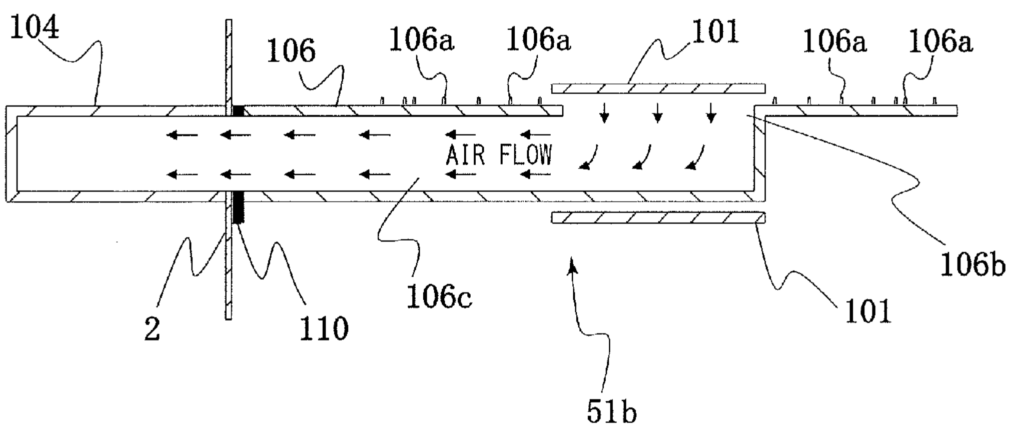
FIG. 4 is a cross-sectional view illustrating an air suction path of the pre-fixing conveyance unit.

As illustrated in FIG. 4, the guide member 106 is formed in a hollow shape, and an opening portion 106*b* opposed to an inner circumference surface of the conveyor belt 101 and opened upward is formed on the guide member 106. Further, a ventilating duct portion 106*c* extending to one direction in a width direction is provided at an end portion of the guide member 106 in the width direction. FIG. 4 is a cross-sectional view taken at a position illustrated in FIG. 3.

The ventilating duct portion 106*c* is connected to a fixed duct 104 fixed to a side panel 2*a* through an opening portion formed on the side panel 2*a*. The side panel 2*a* is fixed to the apparatus body 2, and the opening of the side panel 2*a* and the ventilating duct portion 106*c* are connected airtightly by a sponge-like seal member 110. Further, a suction fan 105 discharging air to an outer side of the fixed duct 104 is arranged on the end portion of the fixed duct 104 as a suction apparatus configured to take in air (refer to FIG. 3).

According to this configuration, in a state where the suction fan 105 is operated, air is taken in through air holes of the conveyor belt 101, as illustrated in FIG. 4, and air is discharged by the suction fan 105 through the ventilating duct portion 106*c* and the fixed duct 104. Then, the sheet S is sucked onto the conveyor belt 101 by negative pressure generated at an upper surface of the conveyor belt 101.

Sheet Conveyance Path in Vicinity of Pre-Fixing Conveyance Unit

Figure 5A:
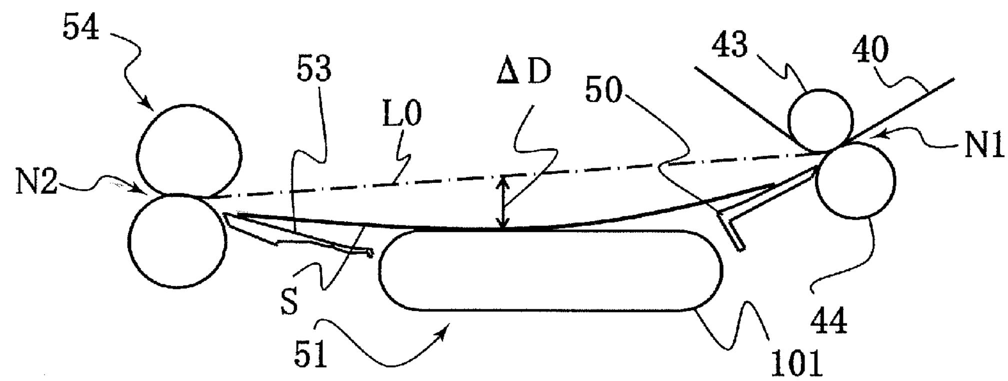
FIG. 5A is a schematic diagram illustrating a sheet conveyance path near a pre-fixing conveyance unit.

Next, a conveyance path of the sheet S in the vicinity of the pre-fixing conveyance unit 51 will be described. As illustrated in FIG. 5A, the pre-fixing conveyance unit 51 is positioned between a transfer nip portion N1 serving as a nip portion, i.e., transfer portion, between the intermediate transfer belt 40 and the secondary transfer roller 44, and a fixing nip portion N2 serving as a nip portion of the fixing roller pair 54. A transfer exit guide 50 configured to guide the sheet S toward the conveyor belt 101 is arranged on an upstream side of the pre-fixing conveyance unit 51, and a fixing entrance guide 53 configured to guide the sheet S toward the fixing nip portion N2 is arranged on a position downstream of the conveyance portion 51*b*.

The sheet conveyance path between the transfer nip portion N1 and the fixing nip portion N2 is formed to bend downward. That is, a conveyance direction of the sheet S in the transfer nip portion N1 and a conveyance direction of the sheet S in the fixing nip portion N2 are designed to intersect at an offset position on one side, that is, lower side in the drawing, with respect to a straight line L0 connecting the nip portions N1 and N2. The pre-fixing conveyance unit 51 is arranged such that the conveyor belt 101 is separated by distance ΔD toward an outer side of the curve of the sheet conveyance path from the straight line L0. Further, the transfer exit guide 50 and the fixing entrance guide 53 are arranged such that the upper surface constituting a guide surface is inclined downward toward the conveyor belt 101.

According to this configuration, the sheet S is conveyed in a curved state near the pre-fixing conveyance unit 51. Therefore, even if there is a difference in conveyance speed of the sheet S in the transfer nip portion N1 and the fixing nip portion N2, the speed difference is absorbed by the bending of the sheet S. Thereby, problems that occur by the difference in conveyance speed, such as image defects caused by having tension applied on the sheet S, can be prevented. Further, retention force of the sheet S by the conveyor belt 101 is set to be smaller than a retention force of the sheet by the transfer nip portion N1 and the fixing nip portion N2 retaining the sheet S by the nip pressure of the roller pair. Therefore, even in a state where there is a difference in conveyance speeds between the transfer nip portion N1 or the fixing nip portion N2 and the conveyor belt 101, it becomes possible to prevent the toner image from being disarranged by the slipping of the conveyor belt 101 on a rear surface of the sheet S at the nip portion.

If a sheet S such as cardboard having a high stiffness, that is, high basis weight, is conveyed, the sheet is conveyed in a state where the bending is smaller than the sheet S having a low stiffness, due to its own stiffness. In this case, the conveyor belt 101 may be separated from the sheet S, and conveyance error of the sheet S may occur near the pre-fixing conveyance unit 51.

Figure 5B:
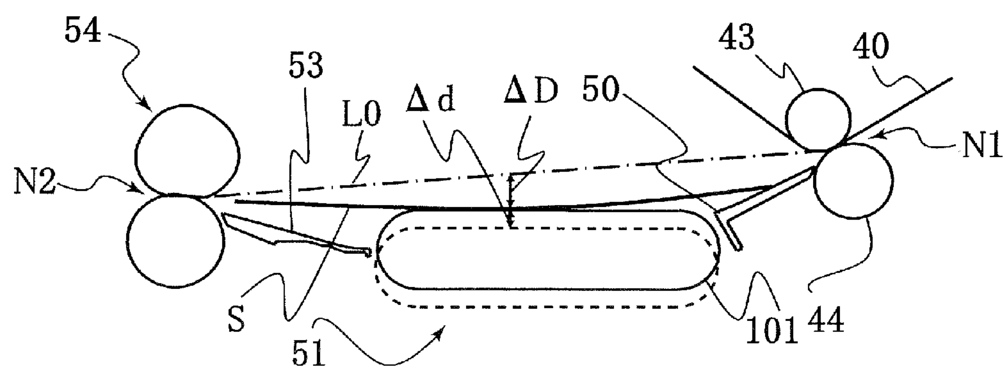
FIG. 5B is a schematic diagram illustrating a state where a conveyor belt is elevated.

Therefore, according to the present embodiment, as illustrated in FIG. 5B, the conveyor belt 101 is configured movably in the direction moving toward and away from the straight line L0 connecting the nips. That is, if the sheet has a high stiffness, the conveyor belt 101 is moved upward corresponding to displacement Δd, such that distance ΔD to the straight line L0 is set small. Thereby, the suction of the sheet S by the conveyor belt 101 can be facilitated, and even if the stiffness of the sheet S is relatively high, the sheet S can be conveyed stably.

Drive Configuration of Pre-Fixing Conveyance Unit

Figure 6:
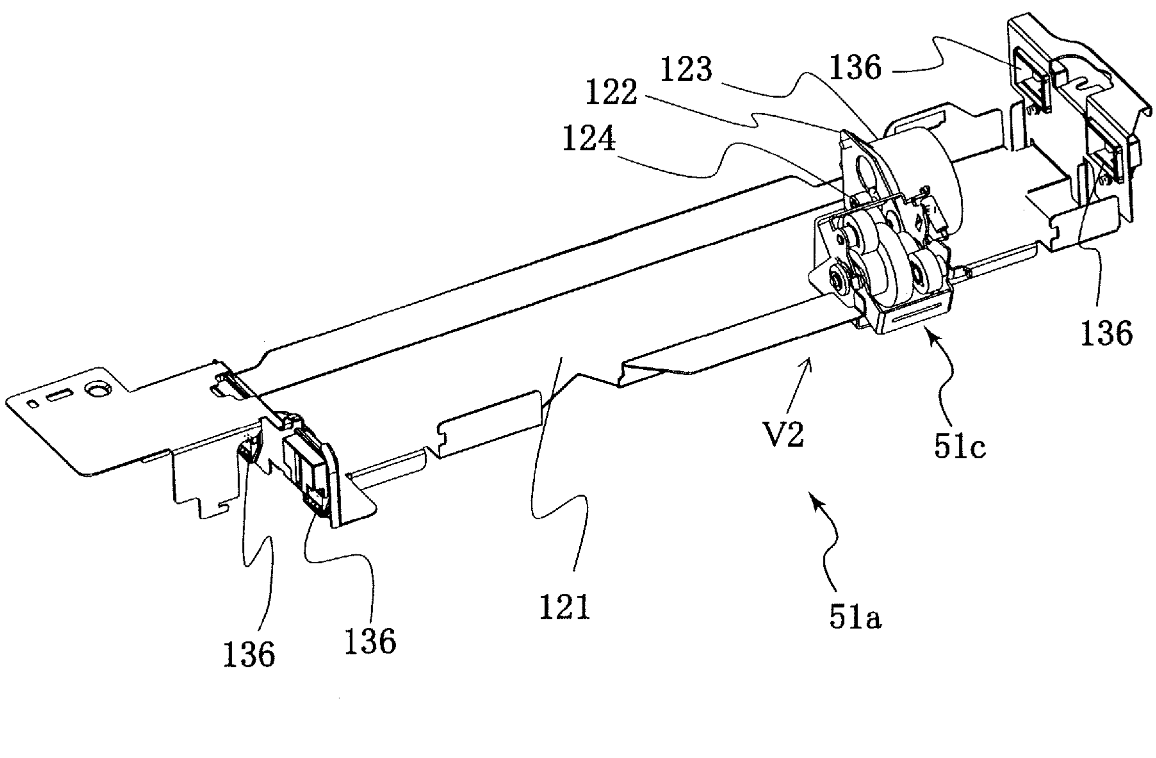
FIG. 6 is a perspective view of a fixing unit of the pre-fixing conveyance unit.

Next, a drive configuration of the pre-fixing conveyance unit 51 capable of conveying the sheet S and capable of moving with respect to the apparatus body 2 will be described. As illustrated in FIG. 6, the base portion 51*a* serving as a driving unit includes a frame 121 serving as a fixing frame fixed to the apparatus body 2, and a driving unit 51*c* supported on the frame 121. The conveyance portion 51*b* described above including the conveyor belt 101 is supported movably in the vertical direction, that is, elevatably, with respect to the apparatus body 2 by the base portion 51*a*.

Figure 7B:
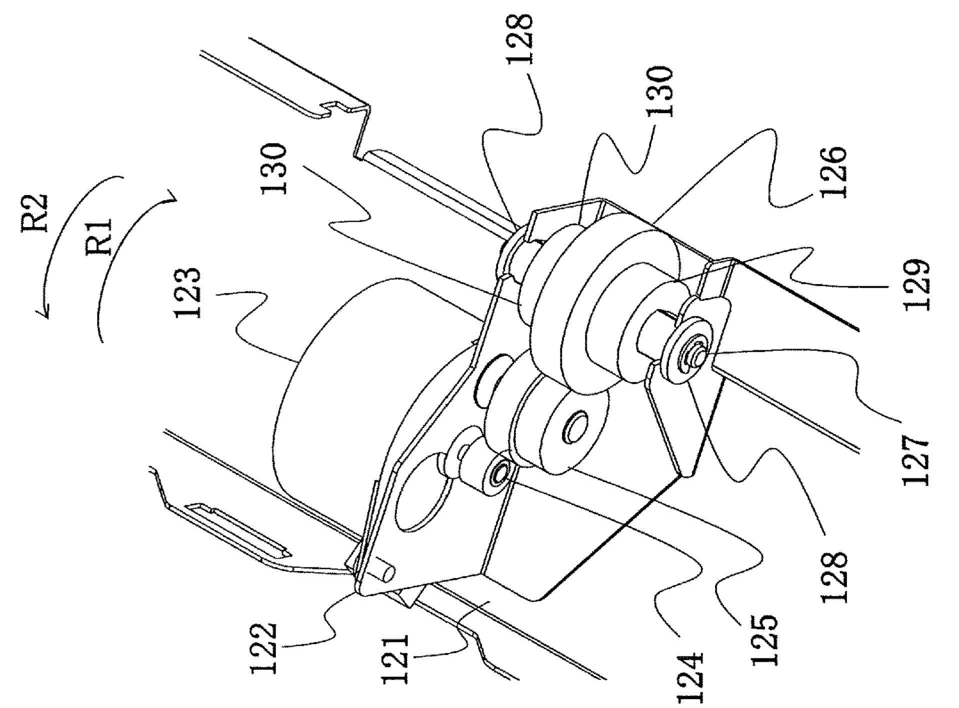
FIG. 7B is a perspective view illustrating a driving unit in a state where a swing portion has been removed.
Figure 7A:
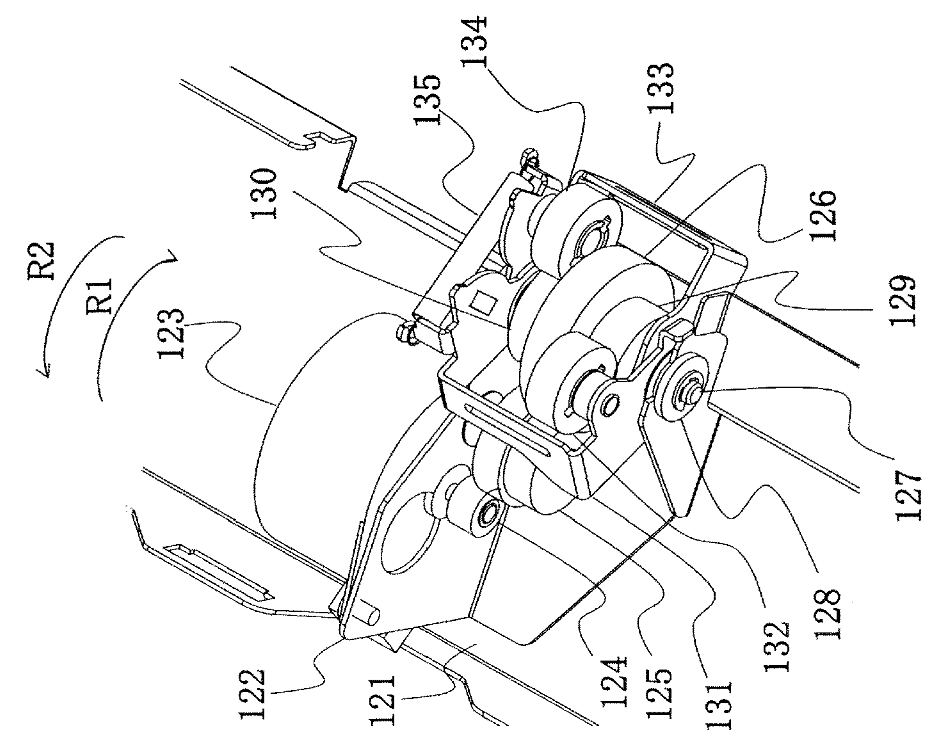
FIG. 7A is a perspective view illustrating a driving unit of the pre-fixing conveyance unit.

The driving unit 51*c* serves as a drive transmission apparatus configured to transmit driving force output from a motor 123 serving as a driving source to the conveyance portion 51*b*. As illustrated in FIGS. 7A and 7B, the driving unit 51*c* includes, as a portion of a group of gears, swing gears (132, 134) capable of swinging by following the movement of the conveyance portion 51*b*. FIG. 7A illustrates a perspective view of the driving unit 51*c* as seen from a direction of arrow V2 illustrated in FIG. 6, and FIG. 7B is a perspective view illustrating the driving unit 51*c* in a state where the swing portion is removed.

As illustrated in FIG. 7B, the motor 123 is held by (fixed to) a support plate 122 serving as a holding member, and supported on the apparatus body 2 via the support plate 122. The motor 123 is capable of outputting rotation in a first direction and a second direction opposite to the first direction via a pinion gear 124 attached to an output shaft. In the following description, a direction of rotation corresponding to the sheet conveyance direction Cv by the conveyor belt 101 is referred to as normal rotation direction R1, and the opposite direction is referred to as reverse rotation direction R2.

The rotation of the pinion gear 124 is reduced by a step gear 125 supported by the support plate 122, and transmitted to an idler gear 126. The idler gear 126 is supported on a drive shaft 127 in a manner incapable of relative rotation, and the drive shaft 127 has both axial end portions supported rotatably with respect to the support plate 122 by a shaft holder 128.

A conveyance one-way gear 129 and an elevation one-way gear 130 relatively rotatable with respect to the drive shaft 127 are arranged on one side and the other side of the idler gear 126 in the axial direction. The one-way gears 129 and 130 are examples of input gears driven by driving force from the driving source. One-way clutches 129*a* and 130*a* (refer to FIG. 12) whose regulating directions of rotation differ are disposed between the conveyance one-way gear 129 and elevation one-way gear 130 and the drive shaft 127. Thereby, if the motor 123 rotates in a normal rotation direction R1, driving force is transmitted to the conveyance one-way gear 129, and if the motor 123 rotates in a reverse rotation direction R2, driving force is transmitted to the elevation one-way gear 130.

Figure 8:
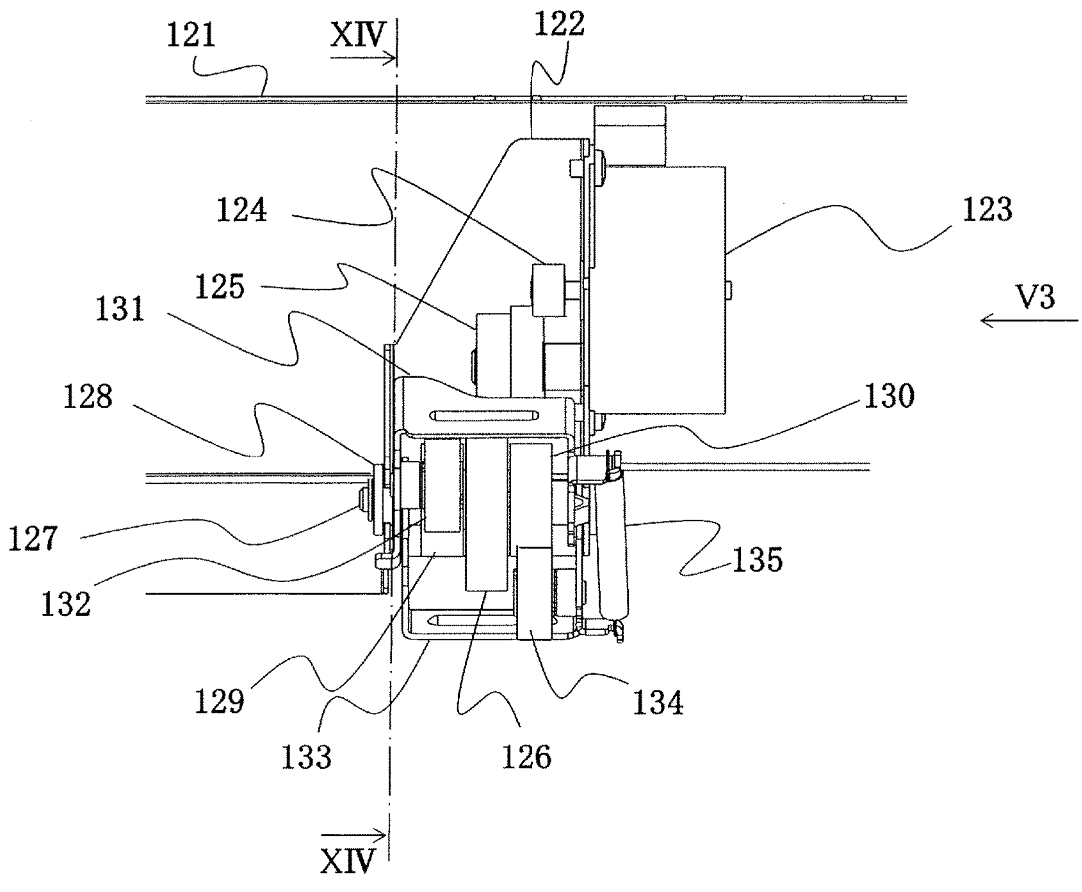
FIG. 8 is an upper view of a driving unit.

As illustrated in FIGS. 7A and 8, a conveyance swing gear 132 and an elevation swing gear 134 are rotatably supported by a conveyance swing arm 131 and an elevation swing arm 133 capable of swinging around the drive shaft 127. The conveyance swing gear 132 and the elevation swing gear 134 are both an example of a swing gear interposed between the input gear and the output gear, and the conveyance swing arm 131 and the elevation swing arm 133 are both an example of a swing member retaining the swing gear. The respective swing arms 131 and 133 are angular U-shaped, i.e., U-shaped with all corners in right angles, swing members supported by the shaft holder 128 on both sides of the idler gear 126 with respect to the axial direction, and each arm is capable of swinging around an axis, that is, rotational axis, of the drive shaft 127. The conveyance swing gear 132 and the elevation swing gear 134 swing in a state being meshed with corresponding one-way gears 129 and 130 along with the swinging of the swing arms 131 and 133.

Figure 9:
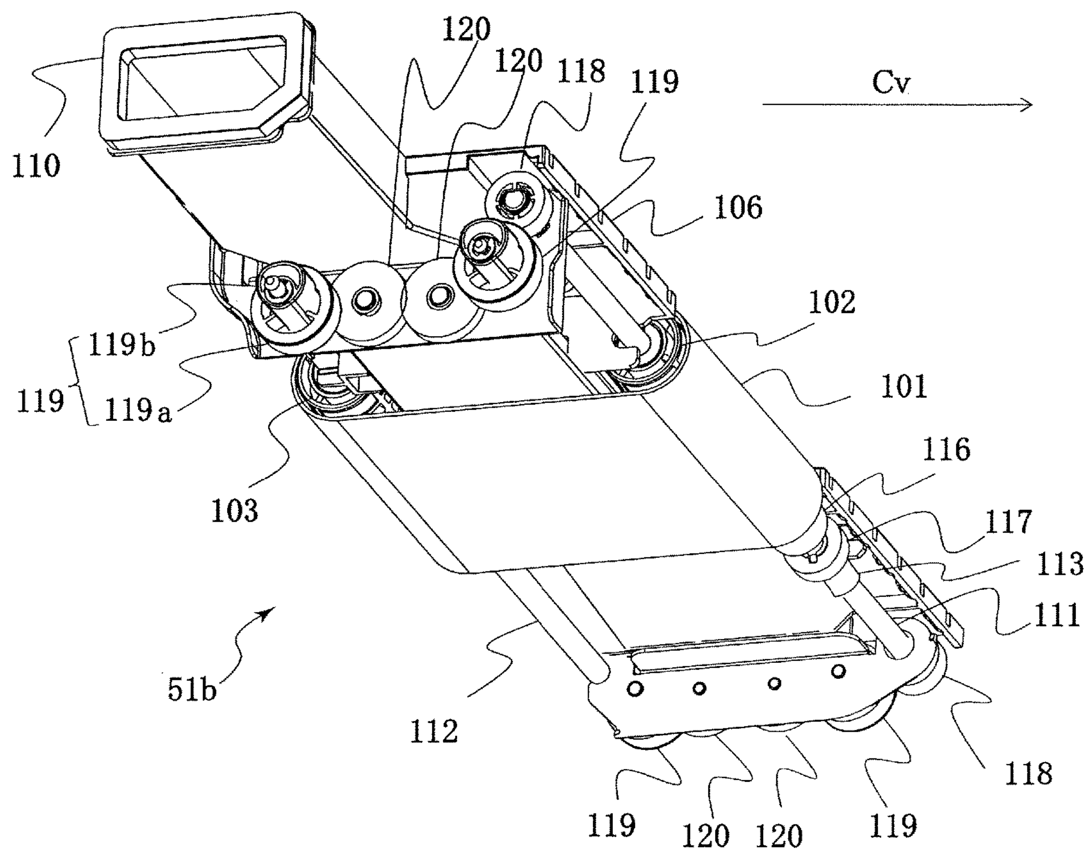
FIG. 9 is a perspective view of a conveyance portion of the pre-fixing conveyance unit.
Figure 10:
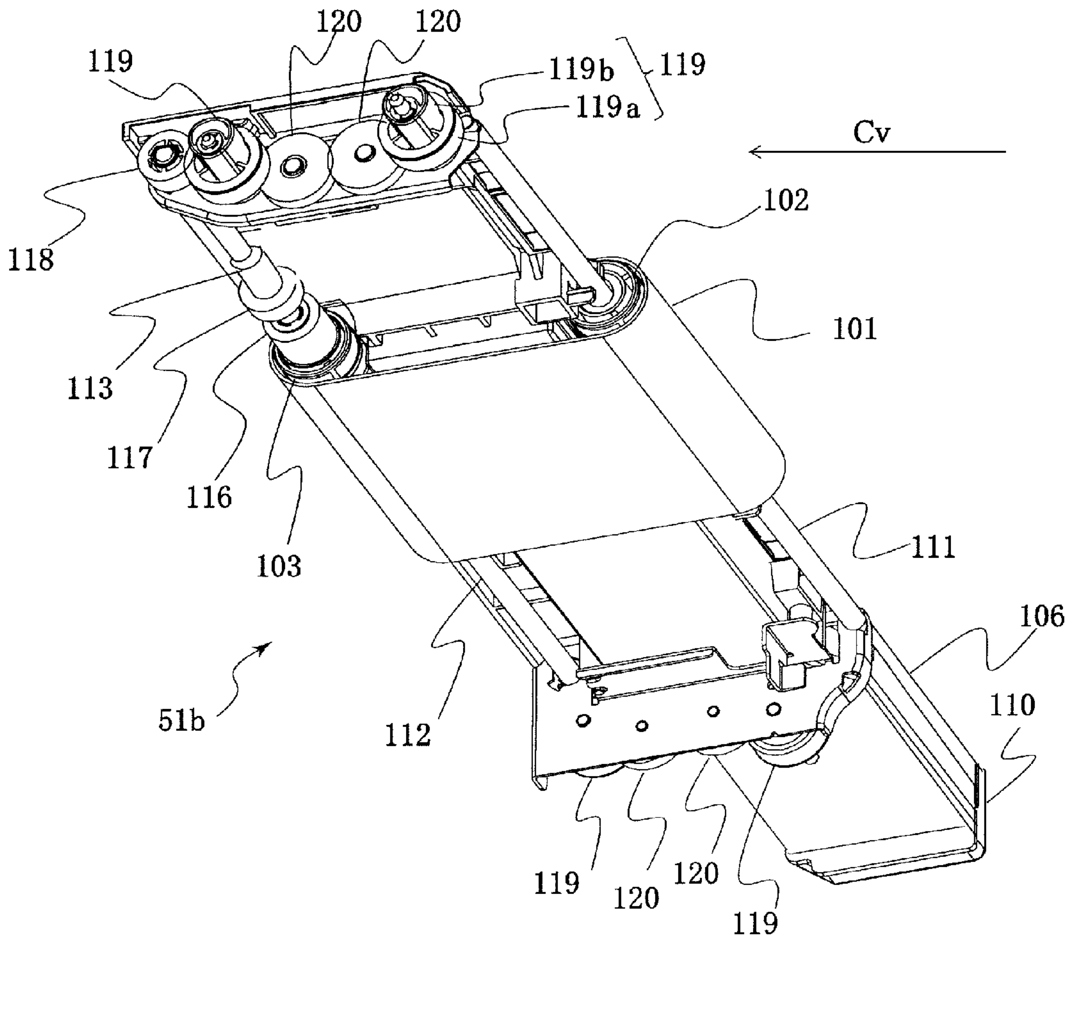
FIG. 10 is a perspective view of the conveyance portion seen from another direction.

As illustrated in FIGS. 9 and 10, a conveyance drive gear 116 and an elevation drive gear 117, which are both an example of an output gear, are arranged on the conveyance portion 51*b* serving as a movable unit. The conveyance drive gear 116 is mounted so as not to be relatively rotated with respect to the drive pulley 102, in a state being loosely-fit to a drive pulley shaft 111 retaining the drive pulley 102 in a rotatable manner. In other words, the drive gear 116 is rotated integrally with the drive pulley 102 around the axis of the drive pulley shaft 111.

Meanwhile, the elevation drive gear 117 is mounted in a manner incapable of relative rotation with respect to the drive pulley shaft 111. In a state where the drive pulley shaft 111 is rotated, elevation output gears 118 and 118 mounted on both end portions in the axial direction of the drive pulley shaft 111 rotate. The respective elevation output gears 118 and 118 rotate the cam gears 119 and 119 connected via two idler gears 120 and 120. The respective cam gears 119 serving as an example of a movement mechanism moving the conveyance unit include a gear portion 119*a* meshed with the idler gear 120 and a cam portion 119*b* being in contact with a cam holder 136 (refer to FIG. 6) formed on the frame 121. In other words, the conveyance portion 51*b* is configured such that the rotation of the elevation drive gear 117 is transmitted to the cam gears 119 arranged at four areas on the conveyance portion 51*b*, and the four cam portions 119*b* serving as elevation cams are rotated in synchronization.

Figure 11:
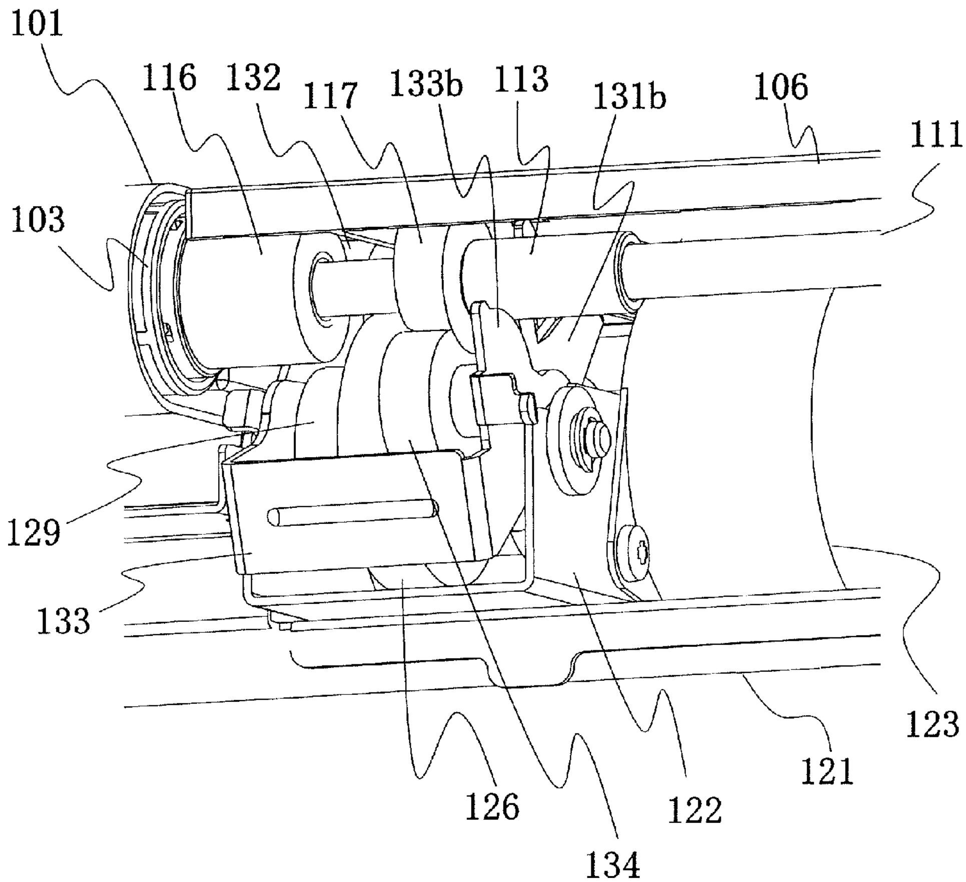
FIG. 11 is a perspective view illustrating a relevant portion of the pre-fixing conveyance unit.

Further, as illustrated in FIG. 11, an abutment portion 113 and contact plates 131*b* and 133*b* are arranged between the conveyance portion 51*b* and the base portion 51*a*, and serve as a mechanism capable of maintaining inter-axis distance between the respective swing gears 132 and 134 and the corresponding drive gears 116 and 117. Note that FIG. 11 is an enlarged view of the pre-fixing conveyance unit 51 as seen from a direction illustrated by arrow V1 of FIG. 2.

The abutment portion 113 is composed of a cylindrical member loosely-fit to the drive pulley shaft 111. The contact plate 131*b* serving as a first contact portion is formed integrally with the conveyance swing arm 131, and the contact plate 133*b* serving as a second contact portion is formed integrally with the elevation swing arm 133. The respective contact plates 131*b* and 133*b* have a circular arc-shaped outer circumference portion centered around a rotational axis of the corresponding swing gear 132 or 134. The components are configured so that a sum of a radius of the abutment portion 113 and a radius of the outer circumference portion of the respective contact plates 131*b* and 133*b* is equal to a sum of pitch radii of the corresponding swing gears 132 and 134 and the drive gears 116 and 117.

A swing spring 135 serving as an urging member configured to urge the arms toward each other is stretched between the conveyance swing arm 131 and the elevation swing arm 133, as illustrated in FIG. 7A. As illustrated in FIG. 11, the contact plates 131*b* and 133*b* of the respective swing arms 131 and 133 are arranged on one side and the other side of the abutment portion 113 with respect to the circumferential direction of the drive shaft 127. Then, the urging force of the swing spring 135 causes the respective contact plates 131*b* and 133*b* to be in pressure contact with the abutment portion

113, and the swing gears 132 and 134 are kept meshing respectively with the one-way gears 129 and 130.

As described, the pre-fixing conveyance unit 51 is equipped with two drive transmission systems configured to transmit rotation output from the motor 123 to the idler gear 126 to operation parts (101, 119) of the conveyance portion 51*b*. A conveyance system for driving the conveyor belt 101 includes the conveyance one-way gear 129, the conveyance swing gear 132, the conveyance drive gear 116 and the drive pulley 102. Further, an elevation system to drive the cam gears 119 includes the elevation one-way gear 130, the elevation swing gear 134, the elevation drive gear 117, the drive pulley shaft 111, the elevation output gears 118 and the idler gears 120. In the present embodiment, the rotational axis of the one-way gears 129 and 130 and the rotational axis of the drive gears 116 and 117 are common among the conveyance system and the elevation system, such that the apparatus can be downsized.

The conveyance one-way gear 129 and the elevation one-way gear 130 respectively serve as the first and second input gears, and the conveyance drive gear 116 and the elevation drive gear 117 respectively serve as the first and second output gears. Further, the conveyance swing arm 131 and the elevation swing arm 133 respectively serve as the first and second swing members, and the conveyance swing gear 132 and the elevation swing gear 134 respectively serve as the first and second swing gears. Here, a first input gear represents one input gear in a drive transmission apparatus including at least one input gear, and a second input gear represents one input gear other than the first input gear in the drive transmission apparatus including at least one input gear in addition to the first input gear. Therefore, in a configuration where the cam gear 119 is driven by a common configuration as the elevation system described above, while the conveyor belt 101 is driven by a configuration that differs from the mechanism according to the above-mentioned conveyance system, the elevation one-way gear 130 serves as the first input gear. The same applies for first and second output gears, first and second swing members, and components associated therewith including ordinal numbers.

Operation of Pre-Fixing Conveyance Unit

Figure 12:
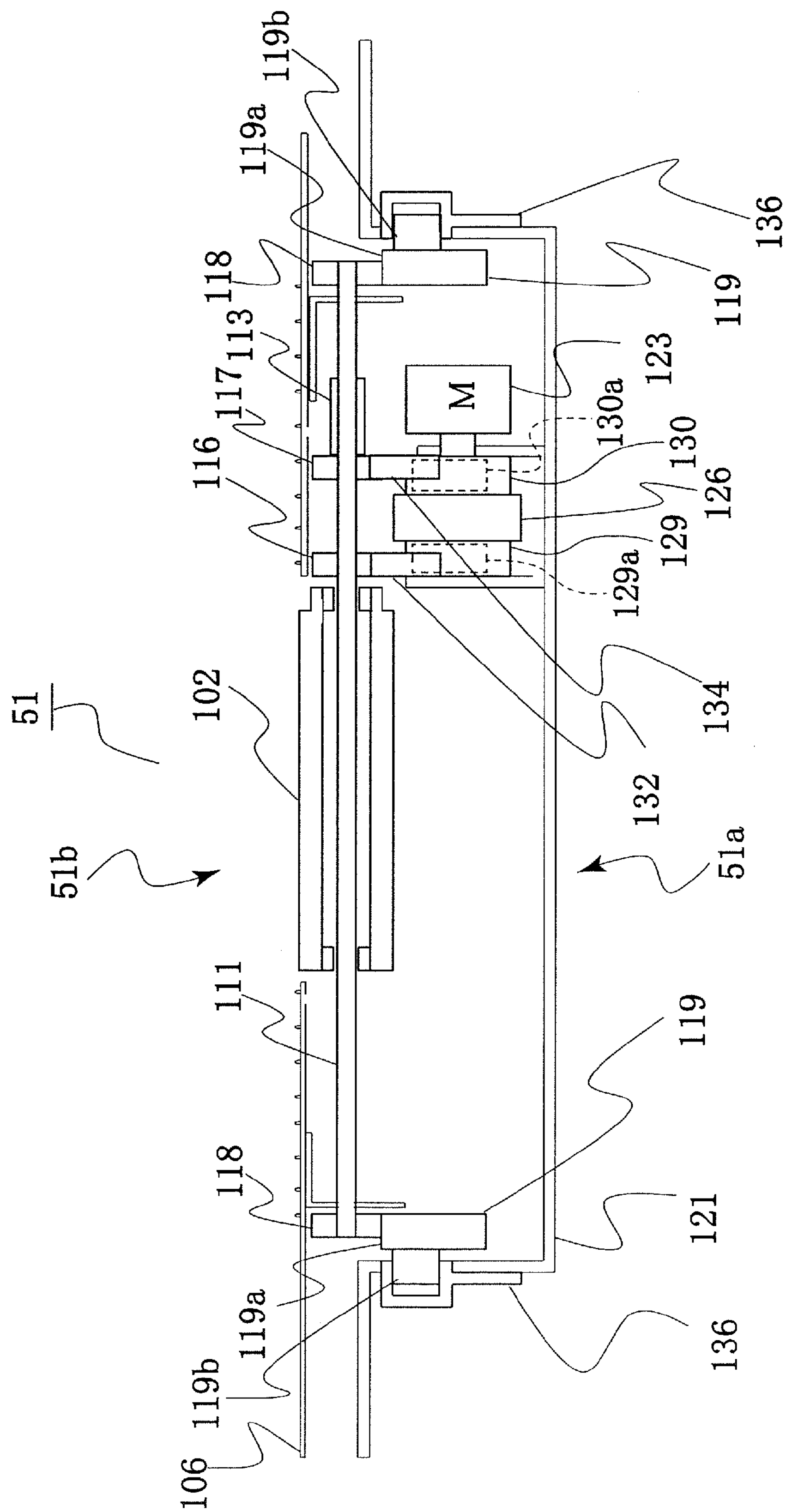
FIG. 12 is a cross-sectional view illustrating a drive configuration of the pre-fixing conveyance unit.

Next, an operation of the pre-fixing conveyance unit 51 will be described with reference to FIG. 12. FIG. is a cross-sectional view of the pre-fixing conveyance unit 51 taken at the position illustrated in FIG. 3. The operation of the pre-fixing conveyance unit 51 is controlled by changing the direction of rotation of the motor 123 by a control unit not shown, based on setting information regarding the stiffness, such as basis weight, of the sheet S, and state of progress of the sheet conveyance operation.

If the motor 123 is rotated in the normal rotation direction, the conveyance one-way gear 129 out of the one-way gears 129 and 130 is rotated by the action of the one-way clutch. Then, rotation is transmitted via the conveyance swing gear 132 and the conveyance drive gear 116 to the drive pulley 102, and the conveyor belt 101 is driven by the drive pulley 102. In this case the respective members of the elevation system do not receive input of the driving force, and the conveyance portion 51*b* is retained at a fixed height.

If the motor 123 is rotated in the reverse rotation direction, the elevation one-way gear 130 out of the one-way gears 129 and 130 is rotated by the action of the one-way clutch. Then, rotation is transmitted via the elevation swing gear 134 and the elevation drive gear 116 to the drive pulley shaft 111. The rotation of the drive pulley shaft 111 is distributed to four cam gears 119 by the action of the elevation output gears 118 and the idler gears 120 (not shown), and along with the rotation of the cam portion 119*b*, the conveyance portion 51*b* moves in the vertical direction with respect to the frame 121. The shape of the cam portions 119*b* is set so that the conveyance portion 51*b* moves from one position to another position between the upper direction and the lower direction while the cam gears 119 rotate for 180 degrees, for example. While the motor 123 rotates in the reverse rotation direction, the respective members of the conveyance system do not receive input of driving force, and input of driving force to the conveyor belt 101 is stopped.

Assembly Configuration of Swing Gear

Next, a configuration for assembling a driving unit 51*c* including two swing arms 131 and 133 to the apparatus body 2 will be described with reference to FIGS. 13 through 17. At first, the configuration and assembling operation for assembling the swing arms 131 and 133 as a part of the driving unit 51*c* will be described, and thereafter, the configuration and assembling operation for assembling the driving unit 51*c* to the frame 121 will be described.

Figure 13B:
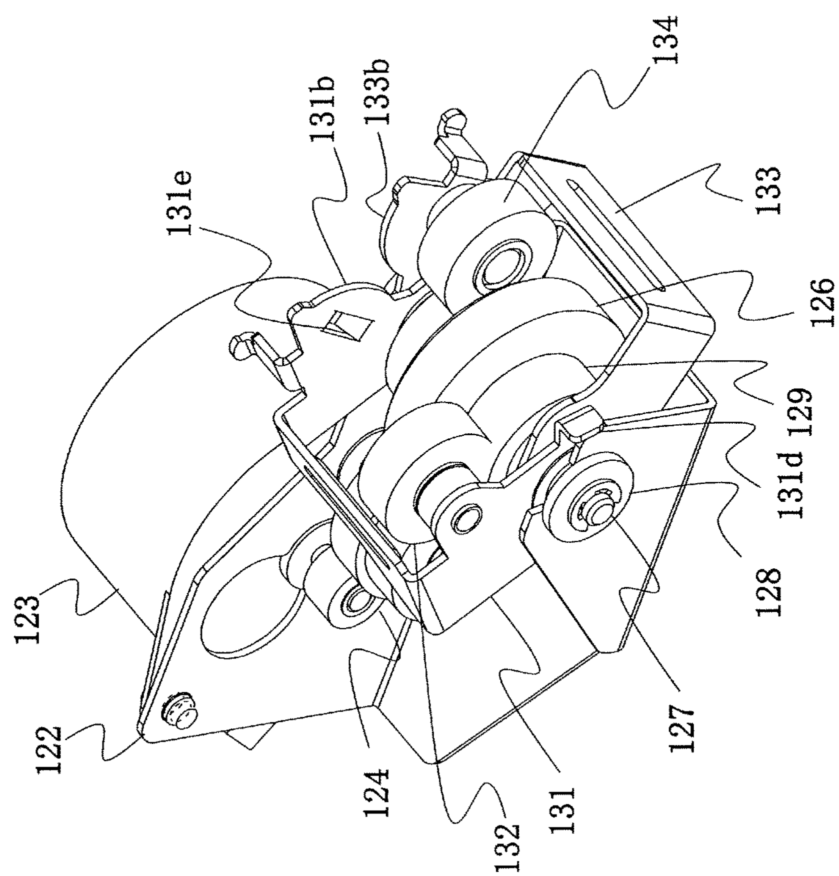
FIG. 13B is a perspective view illustrating a state in which the swing gear mechanism is assembled.
Figure 13A:
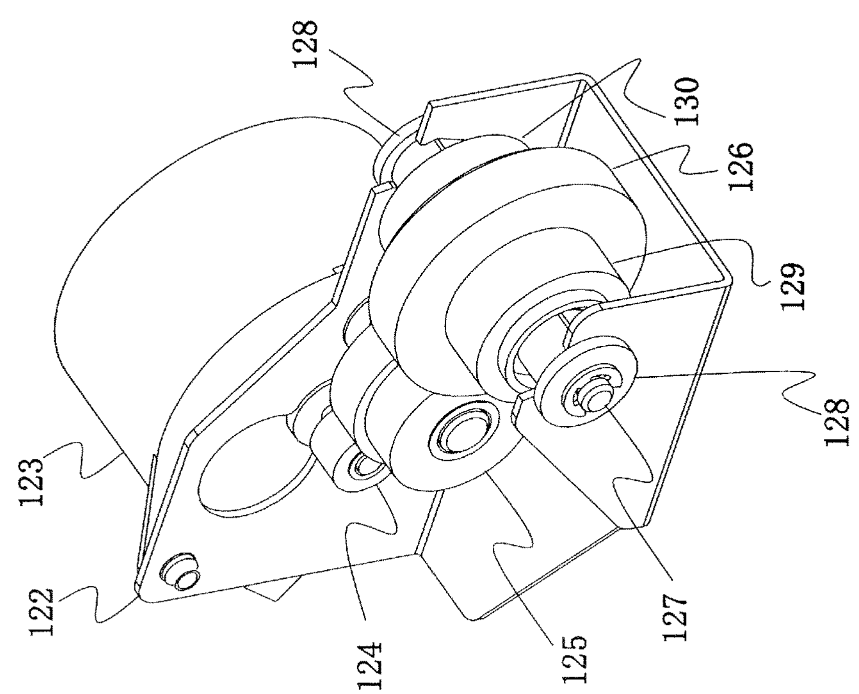
FIG. 13A is a perspective view illustrating a state prior to assembling a swing gear mechanism in an assembling process of the driving unit.

As illustrated in FIG. 13A, the motor 123, the step gear 125, the idler gear 126, the conveyance one-way gear 129 and the elevation one-way gear 130 are supported on the support plate 122, in a state before the swing arms 131 and 133 are assembled. The shaft holders 128 and 128 retaining the drive shaft 127 are fixed by an E-ring and the like to the support plate 122. As illustrated in FIG. 13B, the swing arms 131 and 133 are respectively inserted from the outer side in the radial direction to the drive shaft 127, to be attached to the shaft holder 128 in a state supported by the shaft holder 128.

The detailed configuration of the swing arms 131 and 133 and the assembling process thereof will be described with reference to FIGS. 14A through 14E. The respective views of FIGS. 14A through 14E illustrate the cross-section of the driving unit 51*c* at the position illustrated in FIG. 8. Further, FIGS. 14A through 14E illustrate respective steps of the assembling operation performed in the named order. In the following description, the angles of the members are described based on a horizontal direction of the apparatus body 2. Further, the angle of the swing arms 131 and 133 is determined based on the direction in which the arm is extended from the drive shaft 127 as seen from the axial direction. However, the method of describing the angle is arbitrary, as long as an assembling angle θa described later and a swing range are in an appropriate relative relationship.

Figure 14A:
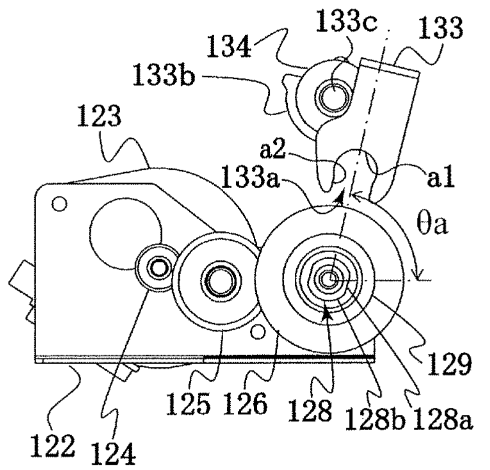
FIG. 14A is a cross-sectional view illustrating a first step of an assembling process of the swing gear mechanism.

As illustrated in FIG. 14A, the shaft holder 128 serving as a supporting portion supporting the two swing arms 131 and 133 has a so-called two-side cutaway shape, or a letter I-shaped cut, in which a portion of a cylindrical outer circumference surface is cut away at two planes. That is, when seen from the axial direction of the idler gear 126, the shaft holder 128 includes an outer contact portion 128*b* composed of a circular arc-shaped outer circumference surface, and two planar portions 128*b* and 128*a* interposing the rotational axis and opposed to one another. The respective planar portions 128*a* are formed along a predetermined position, that is, along an assembling angle θa, which is the direction of insertion of the elevation swing arm 133.

Meanwhile, the elevation swing arm 133 includes, in addition to a retaining portion 133*c* configured to retain the elevation swing gear 134 rotatably, a cutout portion 133*a* having an end portion of the arm cut out, the cutout portion 133*a* serving as an engagement portion configured to be attached to and detached from, i.e., engaged with and disengaged from, the shaft holder 128. The cutout portion 133*a* includes a circular arc-shaped inner contact portion a1 formed along an inscribed circle having an approximately same diameter as the outer contact portion 128*b* of the shaft holder 128 and an opening a2 formed to open outward from the inner contact portion a1 with a width smaller than the diameter of the inscribed circle.

Planar portions 128*a* and 128*a* of the shaft holder 128 is formed to have a width equal to or smaller than an opening width of the opening portion a2 as seen from the assembling angle θa. That is, the respective planar portions 128*a* are an example of a small width portion formed to have a smaller width than the outer diameter of the outer contact portion 128*b*. Further, the outer contact portion 128*b* having a greater outer diameter than the small diameter portion serves as a slide contact surface capable of being in slide contact with the inner contact portion a1 of the cutout portion 133*a* in a state where the elevation swing arm 133 is assembled.

The operator inserts the elevation swing arm 133 with the elevation swing gear 134 assembled thereto along the assembling angle θa while opposing the opening a2 of the cutout portion 133*a* to the planar portions 128*a* and 128*a* of the shaft holder 128. Then, as illustrated in FIG. 14B, the shaft holder 128 comes in contact with the inner contact portion a1 of the cutout portion 133*a* in a state where the planar portions 128*a* and 128*a* have passed through the opening portion a2.

Figure 14D:
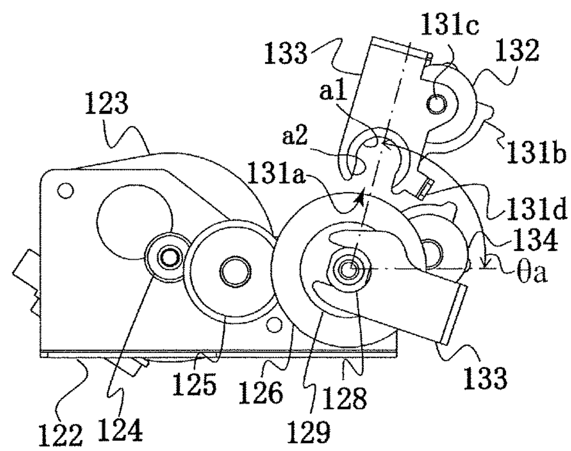
FIG. 14D is a cross-sectional view illustrating a fourth step of the assembling process.
Figure 14B:
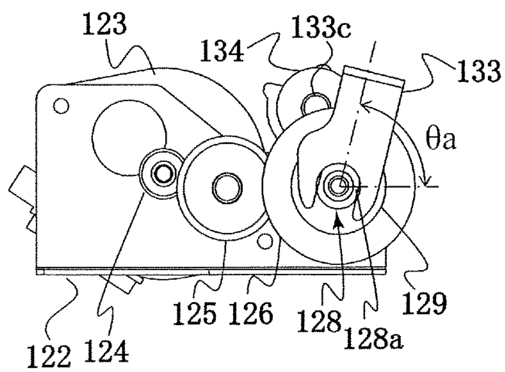
FIG. 14B is a cross-sectional view illustrating a second step of the assembling process.
Figure 14E:
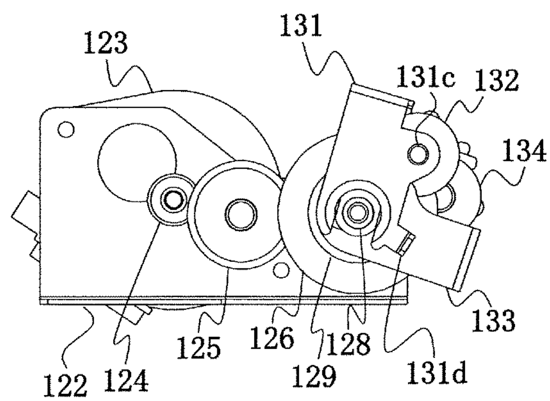
FIG. 14E is a cross-sectional view illustrating a fifth step of the assembling process.
Figure 14C:
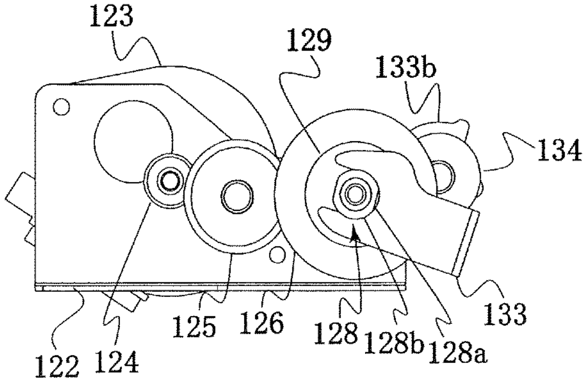
FIG. 14C is a cross-sectional view illustrating a third step of the assembling process.

Further, if the elevation swing arm 133 is pivoted from the assembling angle θa, as illustrated in FIG. 14C, the inner contact portion a1 comes in contact with the outer contact portion 128*b*, while the opening portion a2 is not opposed to the planar portion 128*a*. In this state, the cutout portion 133*a* is retained pivotably but unmovably in the radial direction by the outer contact portion 128*b* having a greater outer diameter than the opening portion a2. In other words, the elevation swing arm 133 is locked by the shaft holder 128.

Meanwhile, as illustrated in FIG. 14D, the conveyance swing arm 131 is assembled to the shaft holder 128 in a similar mechanism as the elevation swing arm 133. That is, the conveyance swing arm 131 includes a retaining portion 131*c* configured to retain the conveyance swing gear 132 rotatably, and a cutout portion 131*a* serving as an engagement portion engaged in a disengageable manner with the shaft holder 128. The cutout portion 133*a* includes the circular arc-shaped inner contact portion a1 and the opening portion a2 having a smaller width than the diameter of the inscribed circle. The width of the planar portions 128*a* and 128*a* of the shaft holder 128 is, as seen from the assembling angle θa, set to be equal to or smaller than an opening width with respect to the opening portion a2 of the conveyance swing arm 131.

In a state where the elevation swing arm 133 is locked to the shaft holder 128, the operator inserts the conveyance swing arm 131 to which the conveyance swing gear 132 has been assembled along the assembling angle θa while opposing the opening portion a2 of the cutout portion 131*a* to the planar portions 128*a* and 128*a*. Then, as illustrated in FIG. 14E, the planar portions 128*a* and 128*a* pass through the opening portion a2, and the shaft holder 128 comes in contact with the inner contact portion a1 of the cutout portion 131*a*. The conveyance swing arm 131 is moved to an angle that differs from the assembling angle θa in an assembling process of the driving unit 51*c* described later, and locked by the shaft holder 128.

Figure 15A:
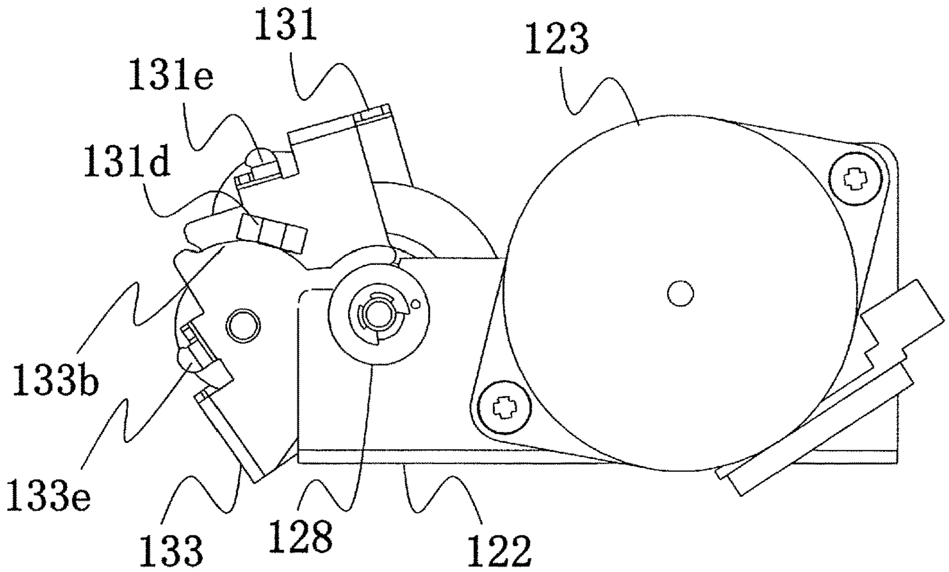
FIG. 15A is a side view illustrating a state prior to assembling a swing spring in the assembling process of the driving unit.
Figure 15B:
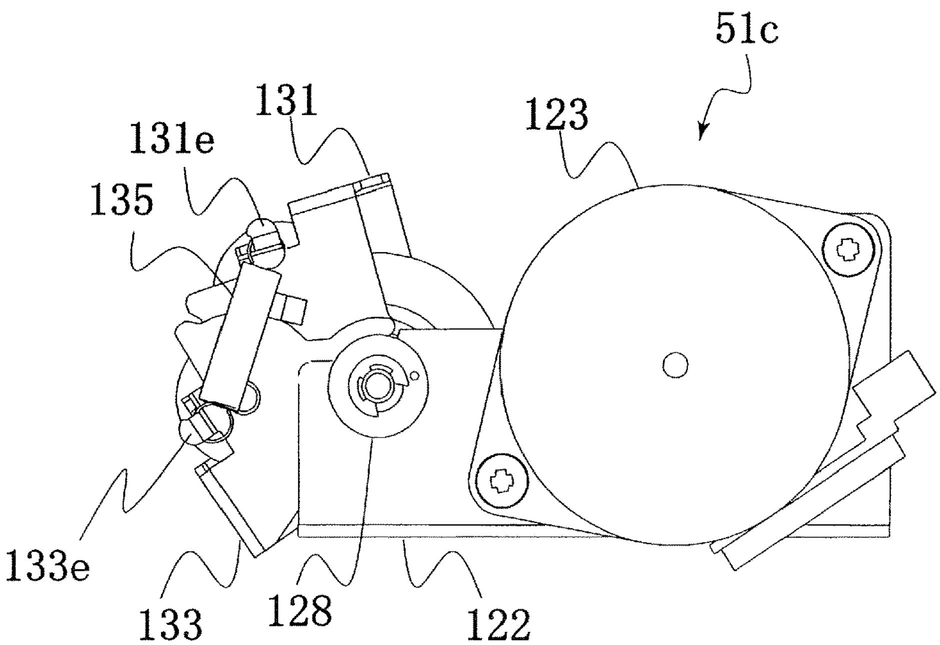
FIG. 15B is a side view illustrating a state in which the swing spring is assembled.

Next, an assembling process of the swing spring 135 connecting the two swing arms 131 and 133 will be described. As illustrated in FIG. 15A, supporting projections 131*e* and 133*e*, which are projections for mounting the swing spring 135, are formed to the respective swing arms 131 and 133. Further, a projecting portion 131*d* capable of being in contact with the contact plate 133*b* of the elevation swing arm 133 is provided to the conveyance swing arm 131. Note that FIGS. 15A and 15B are side views of the driving unit 51*c* as seen from a direction illustrated by arrow V3 of FIG. 8.

The operator attaches the swing spring 135 to the supporting projections 131*e* and 133*e* in a state where the conveyance swing arm 131 and the elevation swing arm 133 are mounted to the shaft holder 128. Then, as illustrated in FIG. 15B, the conveyance swing arm 131 and the elevation swing arm 133 are urged in directions approaching each other by the elastic force of the swing spring 135, and the projecting portion 131*d* comes in contact with the contact plate 133*b*. As a result of the above-described process, the driving unit 51*c* to be mounted to the frame 121 is configured.

Figure 16A:
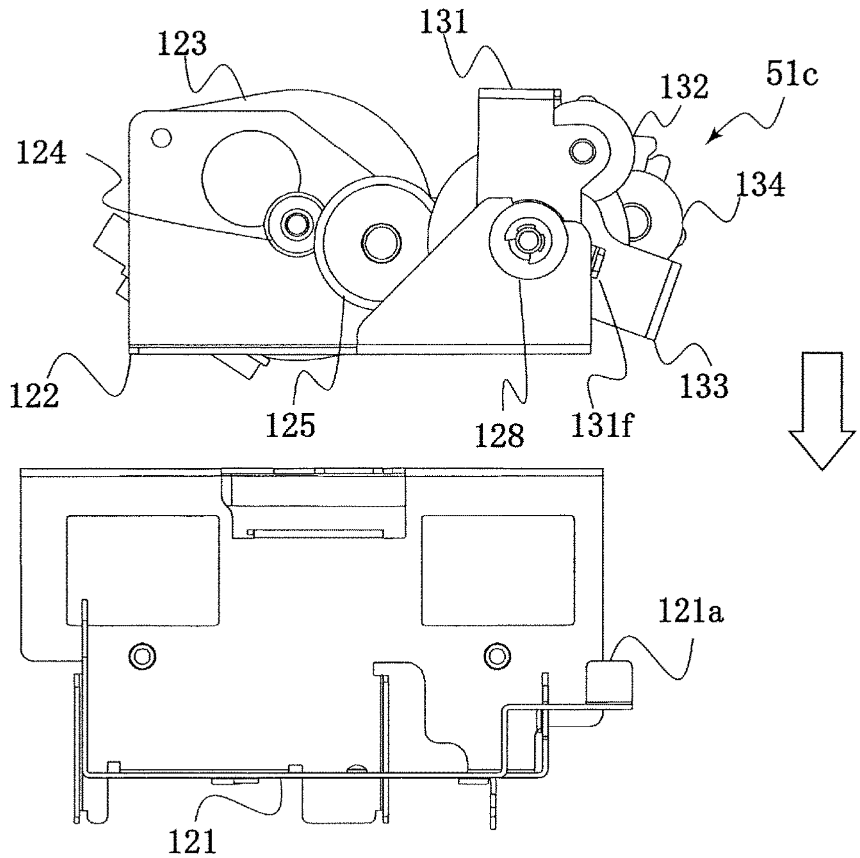
FIG. 16A is a side view illustrating a method for assembling the driving unit to a frame.

Next, a process of mounting the driving unit 51*c* to the frame 121 will be described. As illustrated in FIG. 16A, the driving unit 51*c* is mounted from above to the frame 121. A frame projection 121*a* capable of being in contact with the conveyance swing arm 131 is formed to project upward on the frame 121. Meanwhile, an arm projection 131*f* capable of being in contact with the frame projection 121*a* is provided on the conveyance swing arm 131.

Figure 16B:
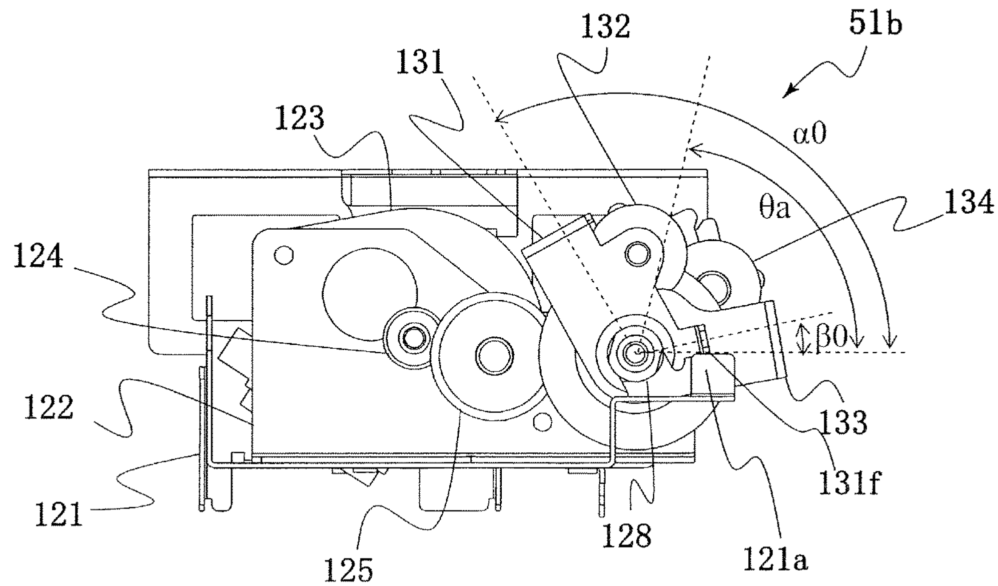
FIG. 16B is a side view illustrating a state in which the driving unit is assembled to the frame.

If the operator moves the driving unit 51*c* downward toward the frame 121, as illustrated in FIG. 16B, the arm projection 131*f* is pressed by the frame projection 121*a*, and the conveyance swing arm 131 pivots. Thereby, the conveyance swing arm 131 moves to an angle α0 that differs from the assembling angle θa. In other words, the frame projection 121*a* operates as a regulation portion regulating the conveyance swing arm 131 from moving to the assembling angle θa in a state where the support plate 122 is mounted to the frame 121.

Further, along with the pivoting of the conveyance swing arm 131, the elevation swing arm 133 is also pivoted in the same direction as the conveyance swing arm 131 against gravity by the urging force of the swing spring 135. The size of pivoting angle of the frame projection 121*a* is set such that angles α0 and β0 of the respective swing arms 131 and 133 are set to different angles as the assembling angle θa in a state where the driving unit 51*c* is in contact with the frame 121. Then, the base portion 51*a* is formed by fixing the support plate 122 to the frame 12.

Finally, a process of mounting the conveyance portion 51*b* to the base portion 51*a* will be described. As described, the conveyance portion 51*b* serving as a conveyance unit is mounted from an upper side to the base portion 51*a* (refer to FIGS. 2 and 6). At this time, the conveyance drive gear 116 and the elevation drive gear 117 of the conveyance portion 51*b* are meshed with corresponding swing gears 132 and 134. Then, the assembly of the pre-fixing conveyance unit 51 is completed by mounting fixtures and attachments as needed.

Figure 17A:
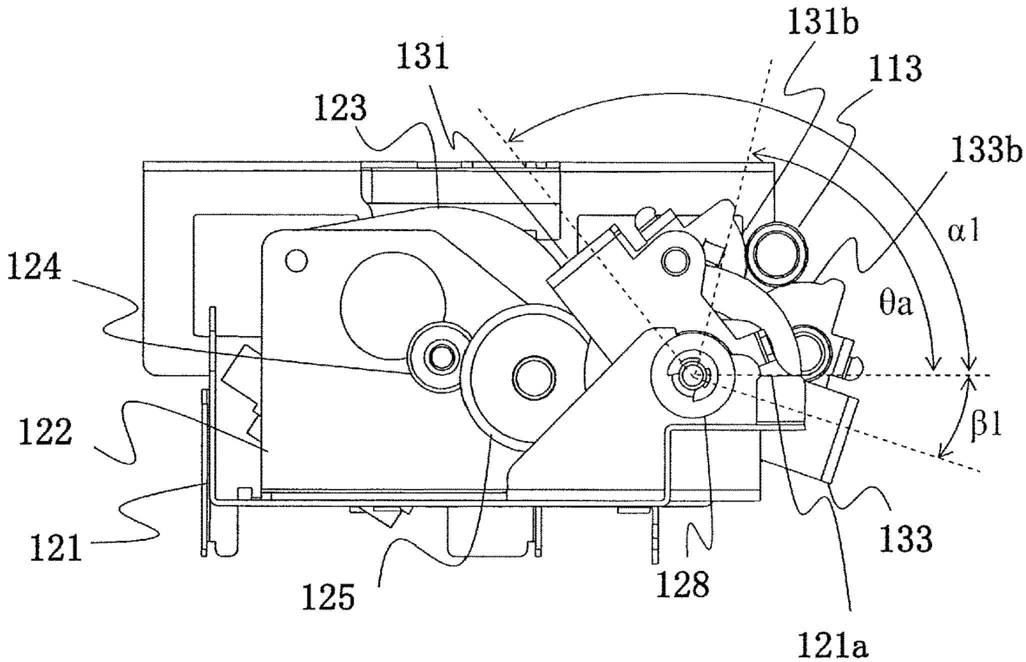
FIG. 17A is a side view illustrating a state of the swing gear mechanism in which the conveyance portion is positioned at a lower position.
Figure 17B:
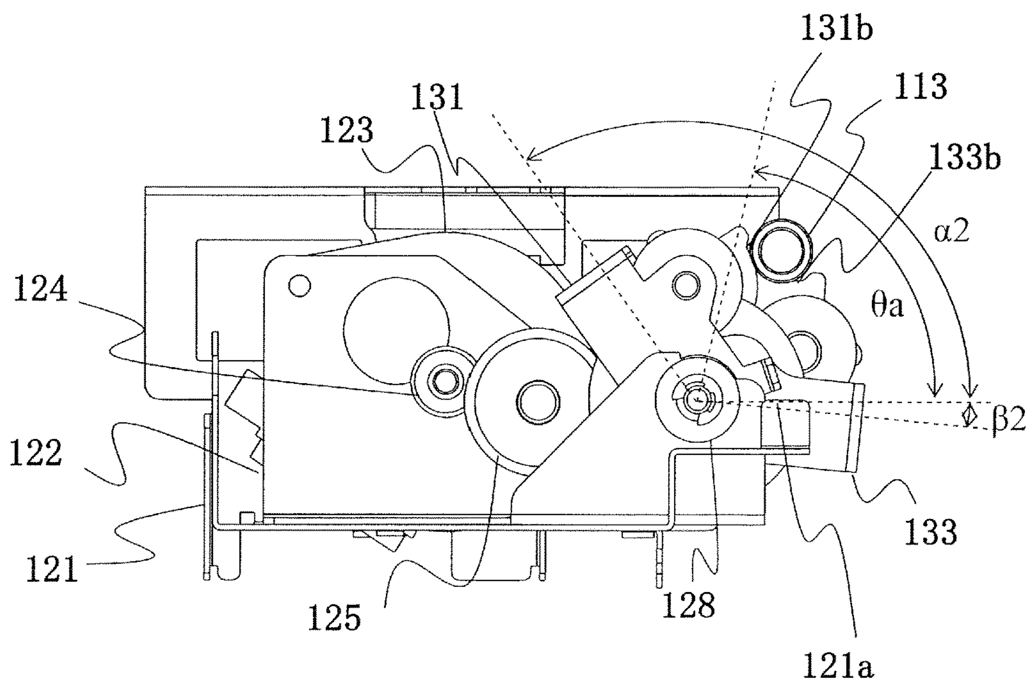
FIG. 17B is a side view illustrating the state of the swing gear mechanism in which the conveyance portion is positioned at an upper position.

As illustrated in FIGS. 17A and 17B, if the conveyance portion 51*b* is mounted to the base portion 51*a*, the abutment portion 113 of the conveyance portion 51*b* will be sandwiched between the two contact plates 131*b* and 133*b*. FIG. 17A illustrates a cross-sectional view of the base portion 51*a* and the abutment portion 113 in a state where the conveyance portion 51*b* is positioned at an upper position, and FIG. 17B illustrates a state where the conveyance portion 51*b* is positioned at a lower position.

In a state where assembly of the conveyance portion 51*b* is completed, the contact plates 131*b* and 133*b* are pressed toward the abutment portion 113 by the urging force of the swing spring 135, such that the state of contact of the respective contact plates 131$b$ and 133$b$ and the abutment portion 113 are maintained. Therefore, while the conveyance portion 51$b$ moves up and down between the upper position and the lower position, the conveyance swing arm 131 swings between an angle $\alpha$1 and an angle $\alpha$2, i.e., within a first swing range, and the elevation swing arm 133 swings between an angle $\beta$1 and an angle $\beta$2, i.e., within a second swing range. Thereby, in a state where the conveyance portion 51$b$ moves between a first position, i.e., upper position, and a second position, i.e., lower position, the respective swing gears 132 and 134 swing in a state being meshed with the corresponding one-way gears 129 and 130 and drive gears 116 and 117.

As illustrated in FIGS. 17A and 17B, a swing range ($\alpha$1 to $\alpha$2) of the conveyance swing arm 131 in a state where the conveyance portion 51$b$ moves up and down, and a swing range ($\beta$1 to $\beta$2) of the elevation swing arm 133 of the same state do not include the assembling angle θa. Therefore, if the respective swing arms 131 and 133 are positioned with the swing range, the inner contact portion a1 of the cutout portions 131$a$ and 133$a$ are retained by the outer contact portion 128$b$ of the shaft holder 128 (refer to FIGS. 14A and 14D), and the swing arms 131 and 133 are prevented from falling.

From the viewpoint of ensuring an effect to prevent the swing arms 131 and 133 from falling, a difference of angle between the assembling angle θa and the swing range should preferably be as close to 90 degrees as possible, as long as the ease of assembling operation is not deteriorated. In the present embodiment, even in a state where the respective swing arms 131 and 133 are positioned closest to the assembling angle θa, i.e., positioned at the angles of $\alpha$2 and $\beta$2, the difference with the assembling angle θa is maintained to be 45 degrees or greater.

Further, in case of maintenance, for example, the swing arms 131 and 133 can be detached from the shaft holder 128 by performing the above-described process in the opposite order. That is, the respective swing arms 131 and 133 should be moved to the assembling angle θa after removing the driving unit 51$c$ from the frame 121 and then removing the driving unit 51$c$. Thereby, the cutout portions 131$a$ and 133$a$ are made detachable from the shaft holder 128, and the swing arms 131 and 133 can be pulled out along the assembling angle θa.

As described, according to the present embodiment (first embodiment of the present disclosure), the swing ranges ($\alpha$1 to $\alpha$2, $\beta$1 to $\beta$2) of the two swing arms 131 and 133 corresponding to the range of elevation operation of the conveyance portion 51$b$ are set so as not to include the assembling angle θa, which is the predetermined position. That is, the shapes of the cutout portions 131$a$ and 133$a$ and the shaft holder 128 are set so that in the assembling process, the respective swing arms 131 and 133 are enabled to be assembled along an angle (θa) out of the swing range of the operation after the assembly. According to this configuration, it becomes possible to assemble the swing gears 132 and 134 and the swing arms 131 and 133 by a simple operation of holding the swing arms 131 and 133 and moving the arms in the radial direction toward the shaft holder 128 serving as the swing shaft.

As a first comparative example with respect to the first embodiment, it is considerable to design the shaft holder in a cylindrical shape, and providing a circular engagement hole to the swing arm for engagement with the shaft holder. However, according to such configuration, it is considered that one can no longer assemble the swing arm by movement in a radial direction. Then, the number of steps or the complexity of the assembling operation may be increased, since it is necessary to retain the swing arm at a position where the swing gear and the corresponding input gear are meshed with each other, and further hold the shaft holder and engage the shaft holder to the engagement hole on the swing arm. Further, even if such a configuration is adopted that a part of the members are temporarily attached in order to reduce the workload, the increase of the number of steps for removing the temporarily attached members or the increase of operation costs caused by using a holding or fastening member to temporary attach the members are concerned.

Further, a second comparative example includes designing the shaft holder in a cylindrical shape and providing a U-shaped cutout portion to the swing arm, to enable assembly of the swing arm by the inserting operation of the arm in the radial direction. In this case, since the cutout portion and the shaft holder are capable of performing relative movement in the radial direction, regardless of the angle of the swing arm, a mechanism to prevent the swing arm from falling is required. However, if the number of components is increased compared to the present embodiment by providing such a fall prevention mechanism, there is fear that the number of steps of the assembling operation or the component costs are increased thereby.

In contrast, according to the present embodiment, a configuration is realized by devising the shapes of the cutout portions 131$a$ and 133$a$ and the shaft holder 128, such that assembly to the shaft holder 128 is enabled at a position along the assembling angle θa, and detachment from the shaft holder 128 is prevented at a position within the swing range after the assembly. Therefore, the number of steps of the assembling operation can be reduced without providing a complex additional mechanism, compared to the first and second comparative examples.

Specifically, according to the present embodiment, in a configuration where two input gears (129, 130) are arranged on a common axis, similar cutout portions 131$a$ and 133$a$ are formed on swing arms 131 and 133 retaining the swing gears 132 and 134 meshed with the respective input gears. Therefore, the gear trains can be made compact, and the workload related to assembling the plurality of swing arms 131 and 133 can be reduced. Further, since the respective swing arms 131 and 133 can be inserted from the same direction to a common shaft holder 128, the assembling operation can be comprehended instinctively, and the configuration can contribute to reducing the workload. The present technique can be applied to only one of the two swing arms 131 and 133, and in a drive transmission apparatus having one set of swing gear and swing arm, the present technique can be applied to the swing gear and the swing arm.

The actual shapes of the engagement portion provided on the swing member, such as the swing arm, and the supporting portion supported on the apparatus body, are not restricted to those described above. For example, it is possible to switch the configurations of the shaft holder 128 and the cutout portions 131$a$ and 133$a$ of the present embodiment, such that the engagement portion has a two-side cutaway shape similar to the shaft holder 128, and the supporting portion has an inner contact portion and an opening portion similar to the cutout portions 131$a$ and 133$a$. According to this configuration, an effect similar to the present embodiment can be realized.

Further, a one-side cutaway shape in which a cylinder is cut away by one plane (D-cut shape) can be adopted instead of the two-side cutaway shape in which the cylinder is cut by two planes, as in the case of the shaft holder 128.

Second Embodiment

Next, a driving unit 51*d* according to a second embodiment will be described with reference to FIGS. 18 and 19. Similar to the driving unit 51*c* according to the first embodiment, the driving unit 51*d* constitutes a portion of the pre-fixing conveyance unit 51 by being mounted to the frame 121, for example. The driving unit 51*d* according to the present embodiment differs from the first embodiment in the actual configuration of the supporting portion. The components that are common to the first embodiment will be assigned with the same reference numbers, and descriptions thereof are omitted.

Figure 18:
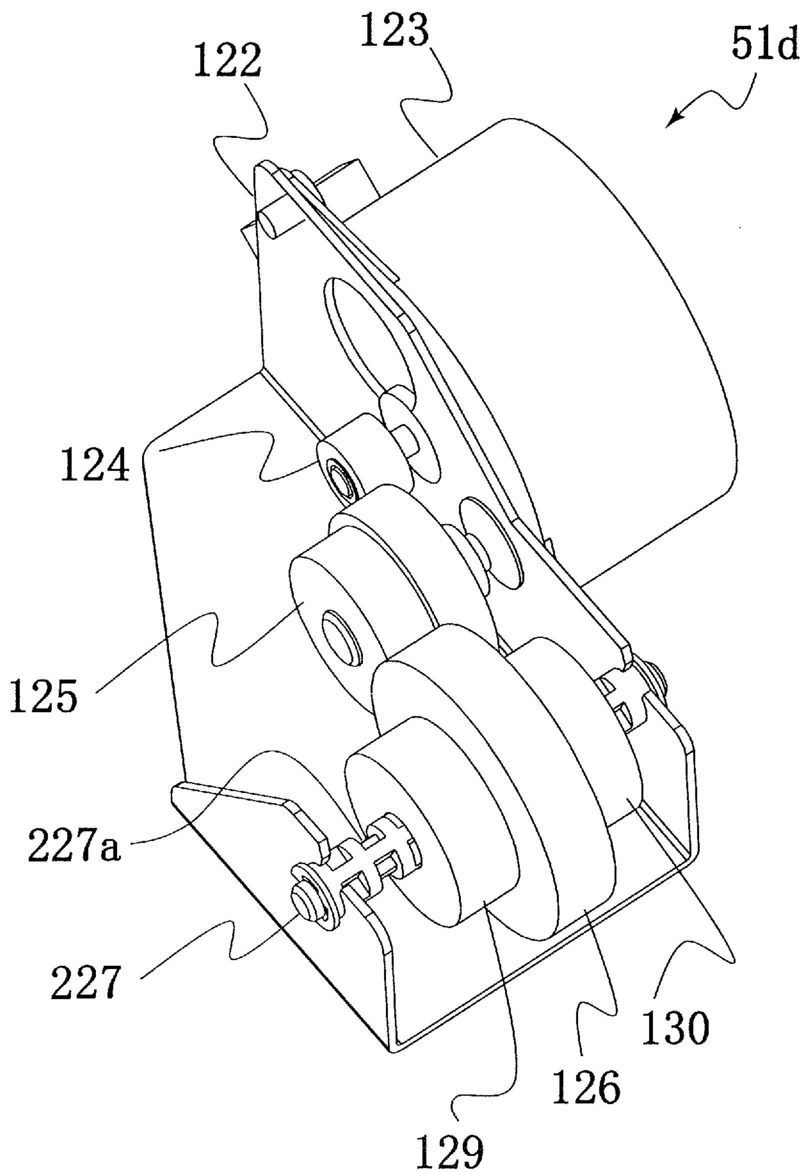
FIG. 18 is a perspective view illustrating a relevant portion of a driving unit according to a second embodiment.

As illustrated in FIG. 18, according to the present embodiment, a supporting portion supporting the conveyance swing arm 131 and the elevation swing arm 133 are configured of a drive shaft 227 supporting the idler gear 126, the conveyance one-way gear 129 and the elevation one-way gear 130. The drive shaft 227 is fixed with respect to the support plate 122, and the idler gear 126 and the one-way gears 129 and 130 are relatively rotatable with respect to the drive shaft 227. Further, a transmission mechanism (refer to FIG. 12 of the first embodiment) such as a coupling or an electromagnetic clutch capable of operating as a one-way clutch is interposed between the idler gear 126 and the respective one-way gears 129 and 130.

Figure 19:
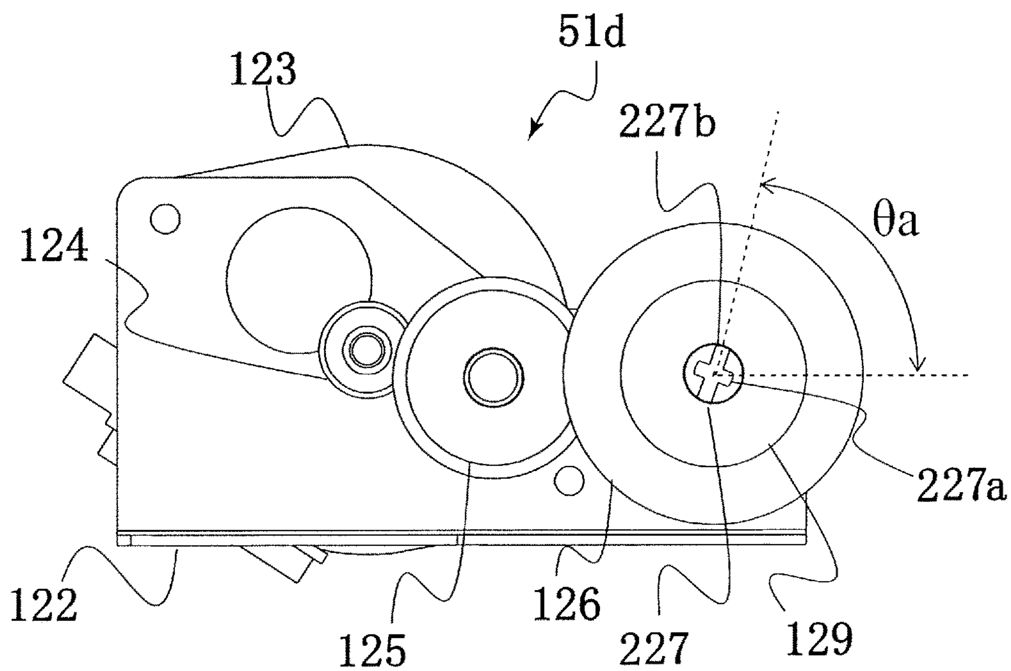
FIG. 19 is a cross-sectional view illustrating a relevant portion of the driving unit according to the second embodiment.

As illustrated in FIG. 19, an outer contact portion 227*b* extending along an assembling angle θa from the center of the drive shaft 227 and an insertion portion 227*a* extending along a direction orthogonal to the assembling angle θa are provided at mounting portions of the swing arms 131 and 133 of the drive shaft 227. The outer contact portion 227*b* is formed to be greater than a width of an opening portion a2 formed on the swing arms 131 and 133, and approximately the same diameter as an inner contact portion a1 (refer to FIGS. 14A and 14D). The insertion portion 227*a* is formed to be equal to or smaller than the width of the opening portion a2 as seen from the assembling angle θa. The insertion portion 227*a* is an example of a small diameter portion, i.e., small width portion, enabling to attach the swing member along the assembling angle θa.

Also according to the present embodiment, similar to the first embodiment, a direction of insertion, i.e., assembling angle θa, of the swing arms 131 and 133 with respect to the drive shaft 227 is configured to be out of the swing ranges of the swing arms 131 and 133 corresponding to the elevation operation range of the conveyance portion 51*b*. Accordingly, even if the configuration of the present embodiment is adopted, the swing gears 132 and 134 and the swing arms 131 and 133 can be assembled by a simple operation of holding the swing arms 131 and 133 and moving the arms in the radial direction toward the shaft holder 128 serving as the swing shaft.

Other Embodiments

In the first and second embodiments described above, an example of applying the configuration of the drive transmission apparatus according to the present embodiment as the driving unit 51*c* of the pre-fixing conveyance unit 51 has been described, but the present technique can also be applied to a drive transmission apparatus of an image forming apparatus or an apparatus used for other purposes. For example, the present technique can be preferably adopted to a sheet conveyance unit other than the pre-fixing conveyance unit of an image forming apparatus, as a driving configuration of a unit movable with respect to the apparatus body.

In the above embodiments, an intermediate transfer-type image forming apparatus 1 utilizing an intermediate transfer belt 40 has been described, but the configurations described above can also be applied to a driving unit of a pre-fixing conveyance unit in a direct transfer type apparatus in which toner image is transferred directly from the photosensitive drum to the sheet. That is, the present technique can be applied to a conveyance unit configured to convey a sheet to a fixing unit from a transfer portion in which a toner image is transferred to a sheet from an image bearing member such as a photoconductor or an intermediate transfer member. Further, the image forming apparatus is not restricted to an electro-photographic system, and may include an apparatus including a known image forming method such as an inkjet system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-137493, filed on Jul. 12, 2016, which is hereby incorporated by reference wherein in its entirety.

What is claimed is:

1. A drive transmission apparatus comprising:
- a first input gear configured to be driven by driving force from a driving source;
- a first swing gear configured to be rotated by driving force from the first input gear;
- a first swing member comprising a first engagement portion and a first retaining portion configured to retain the first swing gear in a rotatable manner; and
- a supporting portion configured to support the first swing member swingably between a first position and a second position in a swinging direction about an axis of the first input gear, wherein the supporting portion comprises:
- a first portion configured to face the first engagement portion and permit the first swing member to be moved with respect to the supporting portion in a direction intersecting the axis of the first input gear in a case where the first swing member is on the first position; and
- a second portion configured to engage with the first engagement portion and restrict the first swing member from being moved away from the supporting portion in the direction intersecting the axis of the first input gear in a case where the first swing member is in the second position.

2. The drive transmission apparatus according to claim 1, wherein the first engagement portion comprises
- an inner contact portion formed along a circle centered on the axis of the first input gear when viewed in an axial direction of the first input gear, and
- an opening portion connected to the inner contact portion and defining an opening by which the inner contact portion is opened outward and which has a width smaller than a diameter of the circle, and wherein the second portion of the supporting portion is an outer contact portion configured to be in slide contact with the inner contact portion, and wherein the first portion of the supporting portion is a small width portion having a width smaller than the width of the opening portion.

3. The drive transmission apparatus according to claim 2, wherein when viewed in the axial direction, the outer contact portion comprises an outer circumference surface shaped into a circular arc, and the small width portion comprises two planes arranged with the axis of the first input gear interposed there between.

4. The drive transmission apparatus according to claim 2, wherein when viewed in the axial direction, the outer contact portion has a first length and extends from the axis in a direction, and the small width portion has a second length smaller than the first length and extends from the axis in a direction orthogonal to the direction in which the outer contact portion extends.

5. The drive transmission apparatus according to claim 1, further comprising:

a fixing frame fixed to an apparatus body; and a holding member configured to hold the first input gear and the supporting portion, the holding member being configured to be mounted to the fixing frame in a state where the first swing member is supported by the supporting portion, wherein the fixing frame comprises a regulation portion configured to contact the first swing member in a state where the holding member is mounted, so that the first swing member is regulated from swinging to the first position in a swinging direction about the axis of the first input gear, and wherein the first engagement portion is attached to and detached from the supporting portion if the first swing member is positioned at the first position in the swinging direction about the axis of the first input gear and is moved in the direction intersecting the axis of the first input gear.

6. The drive transmission apparatus according to claim 1, further comprising:

a second input gear arranged coaxially on the axis of the first input gear and configured to be driven by driving force from the driving source;

a second swing gear configured to mesh with the second input gear; and a second swing member configured to swing the second swing gear and comprising a second engagement portion configured to be engaged with the supporting portion and a second retaining portion configured to retain the second swing gear in a rotatable manner, the second engagement portion being attached to and detached from the supporting portion if the second swing member is moved in a direction intersecting the axis of the first and second input gears.

7. The drive transmission apparatus according to claim 6, wherein the first input gear and the second input gear are configured such that the first input gear rotates if the driving source outputs rotation in a first direction, and the second input gear rotates if the driving source outputs rotation in a second direction opposite to the first direction.

8. The drive transmission apparatus according to claim 1, further comprising:

a first output gear configured to be rotated by driving force transmitted from the first swing gear, and a movable unit movable with respect to an apparatus body in which the supporting portion is provided, the first output gear being provided in the movable unit, wherein the first output gear is movable between positions having different distances from the axis of the first input gear, along with a movement of the movable unit, and the first swing gear is configured to swing in a state being meshed with both the first input gear and the first output gear in a case where the first output gear moves between the positions having different distances from the axis of the first input gear.

9. The drive transmission apparatus according to claim 8, further comprising:

a second input gear arranged coaxially on the axis of the first input gear and configured to be driven by driving force from the driving source;

a second output gear provided in the movable unit and relatively rotatable with respect to the first output gear;

a second swing gear configured to mesh with the second input gear and the second output gear; and a second swing member configured to swing the second swing gear and comprising a second engagement portion configured to be engaged with the supporting portion and a second retaining portion configured to retain the second swing gear in a rotatable manner, the second engagement portion being attached to and detached from the supporting portion if the second swing member is moved is moved in a direction intersecting the axis, wherein the movable unit comprises an abutment portion, the first swing member comprises a first contact portion configured to be in contact with the abutment portion and maintain a distance between axes of the first swing gear and the first output gear, and wherein the second swing member comprises a second contact portion configured to be in contact with the abutment portion and maintain a distance between axes of the second swing gear and the second output gear.

10. The drive transmission apparatus according to claim 9, further comprising an urging member connected to the first swing member and the second swing member, wherein the first swing member and the second swing member are respectively arranged on one side and another side of the abutment portion with respect to a circumferential direction around the axis of the first and second input gears, and wherein the urging member urges the first swing member and the second swing member in directions approaching each other, so that the first contact portion and the second contact portion are in contact with the abutment portion.

11. An image forming apparatus comprising:

an apparatus body comprising an image forming unit configured to form an image on a sheet;

a conveyance unit movable with respect to the apparatus body and configured to convey the sheet;

a driving source arranged in the apparatus body and configured to supply driving force to the conveyance unit; and the drive transmission apparatus according to claim 1, configured to transmit driving force output from the driving source to the conveyance unit.

12. The image forming apparatus according to claim 11, further comprising a fixing unit configured to fix a toner image onto a sheet, wherein the image forming unit comprises an image bearing member configured to rotate while bearing the toner image, and a transfer member configured to be in pressure contact with the image bearing member and forming a transfer portion in which the toner image borne on the image bearing member is transferred onto the sheet, and wherein the conveyance unit is configured to convey the sheet having passed the transfer portion toward the fixing unit.

13. The image forming apparatus according to claim 12, wherein the fixing unit comprises a pair of rotary fixing members configured to nip and convey the sheet, and is arranged such that an intersection position of a conveyance direction of the sheet in the transfer portion and a conveyance direction of the sheet in a nip portion of the pair of the rotary fixing members is offset position from a straight line connecting the transfer portion and the nip portion, and wherein the conveyance unit is configured to move toward and away from the straight line connecting the transfer portion and the nip portion.

14. The image forming apparatus according to claim 11, wherein the conveyance unit comprises a conveyor belt configured to convey the sheet, a suction device configured to suck the sheet onto the conveyor belt, and a support roller configured to support the conveyor belt, wherein the driving source is a motor configured to output rotation in a first direction and rotation in a second direction opposite to the first direction, wherein, if the motor outputs rotation in the first direction, the drive transmission apparatus transmits driving force via the first input gear, the first swing gear and a first output gear, so that the conveyor belt is rotated, and wherein, if the motor outputs rotation in the second direction, the drive transmission apparatus transmits driving force via a second input gear arranged coaxially on the axis of the first input gear and configured to be driven by driving force from the driving source, a second swing gear configured to mesh with the second input gear, and a second output gear provided in the conveyance unit and configured to mesh with the second swing gear, so that the support roller is moved with respect to the apparatus body.

15. An image forming apparatus comprising:

an apparatus body;

a driving source arranged in the apparatus body and configured to output rotation in a first direction and rotation in a second direction opposite to the first direction;

a conveyance unit comprising:

a conveyance member configured to convey a sheet;

a first output gear connected to the conveyance member;

a movement mechanism configured to move the conveyance unit relatively with respect to the apparatus body by the movement mechanism; and a second output gear connected to the movement mechanism; and a drive transmission apparatus configured to transmit driving force from the driving source to the conveyance unit, the drive transmission apparatus comprising:

a first input gear configured to be driven by the driving source if the driving source outputs rotation in the first direction;

a second input gear arranged coaxially with the first input gear and configured to be driven by the driving source if the driving source outputs rotation in the second direction;

a first swing gear meshed with the first input gear and the first output gear;

a second swing gear meshed with the second input gear and the second output gear;

a supporting portion arranged on an axis of the first and second input gears;

a first swing member configured to swing the first swing gear and comprising a first engagement portion configured to be engaged pivotably with the supporting portion and a first retaining portion configured to retain the first swing gear in a rotatable manner, the first engagement portion being attached to and detached from the supporting portion if the first swing member is moved in a radial direction with respect to the axis of the first and second input gears; and a second swing member configured to swing the second swing gear and comprising a second engagement portion configured to be engaged with the supporting portion and a second retaining portion configured to retain the second swing gear in a rotatable manner, the second engagement portion being attached to and detached from the supporting portion if the second swing member is moved in a radial direction with respect to the axis of the first and second input gears.

16. The drive transmission apparatus according to claim 1, further comprising a regulation portion configured to contact the first swing member, so that the first swing member is regulated from swinging to the first position in the swinging direction about the axis of the first input gear.

* * * * *